US00RE46528E

(19) United States
(12) Reissued Patent
Miloslavsky

(10) Patent Number: US RE46,528 E
(45) Date of Reissued Patent: Aug. 29, 2017

(54) IMPLEMENTATION OF CALL-CENTER OUTBOUND DIALING CAPABILITY AT A TELEPHONY NETWORK LEVEL

(71) Applicant: Genesys Telcommunications Laboratories, Inc., Daly City, CA (US)

(72) Inventor: Alec Miloslavsky, Hillsborough, CA (US)

(73) Assignee: GENESYS TELECOMMUNICATIONS LABORATORIES, INC., Daly City, CA (US)

(21) Appl. No.: 14/566,612

(22) Filed: Dec. 10, 2014

Related U.S. Patent Documents

Reissue of:
(64) Patent No.: 5,991,395
Issued: Nov. 23, 1999
Appl. No.: 09/095,732
Filed: Jun. 10, 1998

U.S. Applications:
(63) Continuation-in-part of application No. 08/968,825, filed on Nov. 14, 1997, now Pat. No. 6,005,931.

(51) Int. Cl.
*H04M 1/00* (2006.01)
*H04M 3/523* (2006.01)

(52) U.S. Cl.
CPC ..... *H04M 3/523* (2013.01)

(58) Field of Classification Search
CPC ..... H04M 3/523
USPC ..... 379/265.02
See application file for complete search history.

(56) References Cited

U.S. PATENT DOCUMENTS

| | | | |
|---|---|---|---|
| 3,914,559 | A | 10/1975 | Knollman |
| 4,048,452 | A | 9/1977 | Oehring et al. |
| 4,056,683 | A | 11/1977 | Suehiro |
| 4,290,141 | A | 9/1981 | Anderson et al. |

(Continued)

FOREIGN PATENT DOCUMENTS

| | | |
|---|---|---|
| AT | 270486 | 7/2004 |
| AT | 281039 | 11/2004 |

(Continued)

OTHER PUBLICATIONS

"Competitive Gateway Product," Nikkei Communications, Japan, No. 257, Nov. 1997, 18 pages.

(Continued)

*Primary Examiner* — Michelle Tarae
(74) *Attorney, Agent, or Firm* — Lewis Roca Rothgerber Christie LLP

(57) ABSTRACT

A system (33) for outbound dialing for call centers (11) place an outbound dialer (21) at network level (13), and client call centers provide destination number calling lists. The outbound dialer (21), upon completing a call to a destination number, connects the completed call to a routing point at a client call center. The system (33) may be CTI-enhanced, and can be hosted by a client of a network provider, or by the network provider. Clients may subscribe to the network provider for service, providing calling lists and routing points, and completed calls may be routed to call centers operated by different clients. The architecture and method of the system (33) minimizes the number of leased lines required by each call center taking advantage of the system (33).

13 Claims, 2 Drawing Sheets

(56) References Cited

U.S. PATENT DOCUMENTS 4,320,256 A 3/1982 Freeman
4,345,315 A 8/1982 Cadotte et al.
4,355,207 A 10/1982 Curtin
4,355,372 A 10/1982 Johnson et al.
4,400,587 A 8/1983 Taylor et al.
4,439,636 A 3/1984 Newkirk et al.
4,451,700 A 5/1984 Kempner et al.
4,489,438 A 12/1984 Hughes
4,512,011 A 4/1985 Turner
4,517,410 A 5/1985 Williams et al.
4,521,643 A 6/1985 Dupuis et al.
4,523,055 A 6/1985 Hohl et al.
4,528,643 A 7/1985 Freeny, Jr.
4,539,435 A 9/1985 Eckmann
4,555,903 A 12/1985 Heaton
4,558,180 A 12/1985 Scordo
4,559,415 A 12/1985 Bernard et al.
4,566,030 A 1/1986 Nickerson et al.
4,567,323 A 1/1986 Lottes et al.
4,577,062 A 3/1986 Hilleary et al.
4,577,067 A 3/1986 Levy et al.
4,578,700 A 3/1986 Roberts et al.
4,580,012 A 4/1986 Matthews et al.
4,584,602 A 4/1986 Nakagawa
4,587,379 A 5/1986 Masuda
4,598,367 A 7/1986 DeFrancesco et al.
4,603,232 A 7/1986 Kurland et al.
4,611,094 A 9/1986 Asmuth et al.
4,625,276 A 11/1986 Benton et al.
4,630,200 A 12/1986 Ohmae et al.
4,630,201 A 12/1986 White
4,634,809 A 1/1987 Paulsson et al.
4,649,563 A 3/1987 Riskin
4,654,482 A 3/1987 DeAngelis
4,667,287 A 5/1987 Allen et al.
4,674,044 A 6/1987 Kalmus et al.
4,679,189 A 7/1987 Olson et al.
4,696,029 A 9/1987 Cohen
4,697,282 A 9/1987 Winter et al.
4,737,983 A 4/1988 Frauenthal et al.
4,756,020 A 7/1988 Fodale
4,757,267 A 7/1988 Riskin
4,763,191 A 8/1988 Gordon et al.
4,763,317 A 8/1988 Lehman et al.
4,763,353 A 8/1988 Canale et al.
4,771,425 A 9/1988 Baran et al.
4,785,408 A 11/1988 Britton et al.
4,788,715 A 11/1988 Lee
4,811,382 A 3/1989 Sleevi
4,812,843 A 3/1989 Champion, III et al.
4,829,563 A 5/1989 Crockett et al.
4,831,518 A 5/1989 Yu et al.
4,852,001 A 7/1989 Tsushima et al.
4,866,756 A 9/1989 Crane et al.
4,881,261 A 11/1989 Oliphant et al.
4,893,328 A 1/1990 Peacock
4,896,345 A 1/1990 Thorne
4,897,866 A 1/1990 Majmudar et al.
4,908,850 A 3/1990 Masson et al.
4,924,488 A 5/1990 Kosich
4,943,995 A 7/1990 Daudelin et al.
4,944,038 A 7/1990 Hardy et al.
4,953,204 A 8/1990 Cuschleg, Jr. et al.
4,972,461 A 11/1990 Brown et al.
4,994,985 A 2/1991 Cree et al.
5,001,710 A 3/1991 Gawrys et al.
5,008,930 A 4/1991 Gawrys et al.
5,017,917 A 5/1991 Fisher et al.
5,020,095 A 5/1991 Morganstein et al.
5,036,535 A 7/1991 Gechter et al.
5,058,152 A 10/1991 Solomon et al.
5,062,103 A 10/1991 Davidson et al.
5,073,890 A 12/1991 Danielsen
5,095,504 A 3/1992 Nishikawa et al.
5,117,225 A 5/1992 Wang
5,136,633 A 8/1992 Tejada et al.
5,155,761 A 10/1992 Hammond
5,164,983 A 11/1992 Brown et al.
5,168,515 A 12/1992 Gechter et al.
5,175,800 A 12/1992 Galis et al.
5,179,589 A 1/1993 Syu ..... 379/265
5,181,236 A 1/1993 LaVallee et al.
5,181,239 A 1/1993 Jolissaint
5,185,782 A 2/1993 Srinivasan
5,202,828 A 4/1993 Vertelney et al.
5,206,903 A 4/1993 Kohler et al.
5,208,745 A 5/1993 Quentin et al.
5,212,727 A 5/1993 Ramkumar
5,214,688 A 5/1993 Szlam et al.
5,231,670 A 7/1993 Goldhor et al.
5,247,569 A 9/1993 Cave
5,249,223 A 9/1993 Vanacore
5,253,288 A 10/1993 Frey et al.
5,256,863 A 10/1993 Ferguson et al.
5,261,096 A 11/1993 Howarth
5,271,058 A 12/1993 Andrews et al.
5,274,635 A 12/1993 Rahman et al.
5,274,700 A 12/1993 Gechter et al.
5,274,782 A 12/1993 Chalasani et al.
5,278,898 A 1/1994 Cambray et al.
5,278,977 A 1/1994 Spencer et al.
5,280,625 A 1/1994 Howarter et al.
5,283,638 A 2/1994 Engberg et al.
5,283,856 A 2/1994 Gross et al.
5,285,494 A 2/1994 Sprecher et al.
5,288,147 A 2/1994 Schaefer et al.
5,291,550 A 3/1994 Levy et al.
5,291,551 A 3/1994 Conn et al.
5,291,552 A 3/1994 Kerrigan et al. ..... 379/266
5,299,259 A 3/1994 Otto ..... 379/221
5,299,260 A 3/1994 Shaio
5,301,320 A 4/1994 McAtee et al.
5,309,505 A 5/1994 Szlam et al.
5,311,574 A 5/1994 Livanos
5,311,583 A 5/1994 Friedes et al.
5,315,709 A 5/1994 Alston, Jr. et al.
5,327,486 A 7/1994 Wolff et al.
5,329,583 A 7/1994 Jurgensen et al.
5,333,266 A 7/1994 Boaz et al.
5,335,268 A 8/1994 Kelly, Jr. et al.
5,335,269 A 8/1994 Steinlicht
5,343,477 A 8/1994 Yamada
5,343,518 A 8/1994 Kneipp ..... H04M 3/36 370/522
5,355,474 A 10/1994 Thuraisngham et al.
5,359,649 A 10/1994 Rosu et al.
5,363,507 A 11/1994 Nakayama et al.
5,367,329 A 11/1994 Nakagaki et al.
5,369,695 A 11/1994 Chakravarti et al.
5,384,766 A 1/1995 Yamato et al.
5,384,771 A 1/1995 Isidoro et al.
5,384,829 A 1/1995 Heileman, Jr. et al.
5,384,841 A 1/1995 Adams et al.
5,392,277 A 2/1995 Bernstein
5,392,328 A 2/1995 Schmidt et al.
5,392,345 A 2/1995 Otto
5,392,400 A 2/1995 Berkowitz et al.
5,402,474 A 3/1995 Miller et al.
5,414,762 A 5/1995 Flisik et al.
5,422,813 A 6/1995 Schuchman et al.
5,425,091 A 6/1995 Josephs
5,425,093 A 6/1995 Trefger ..... 379/266
5,426,594 A 6/1995 Wright et al.
5,428,608 A 6/1995 Freeman et al.
5,436,965 A 7/1995 Grossman et al. ..... 379/266
5,436,967 A 7/1995 Hanson
5,440,719 A 8/1995 Hanes et al.
5,444,767 A 8/1995 Goetcheus et al.
5,444,774 A 8/1995 Friedes
5,444,823 A 8/1995 Nguyen
5,450,482 A 9/1995 Chen et al.
5,450,483 A 9/1995 Williams
5,452,350 A 9/1995 Reynolds et al.
5,455,903 A 10/1995 Jolissaint et al.

(56) References Cited

U.S. PATENT DOCUMENTS 5,459,780 A 10/1995 Sand
5,463,685 A 10/1995 Gaechter et al.
5,465,286 A 11/1995 Clare et al.
5,467,391 A 11/1995 Donaghue, Jr. et al. ..... 379/265
5,469,504 A 11/1995 Blaha
5,473,680 A 12/1995 Porter
5,475,813 A 12/1995 Cieslak et al.
5,479,487 A * 12/1995 Hammond ..... H04M 3/51 379/266.07
5,481,616 A 1/1996 Freadman
5,488,648 A 1/1996 Womble
5,491,783 A 2/1996 Douglas et al.
5,493,564 A 2/1996 Mullan
5,495,522 A 2/1996 Allen et al.
5,495,523 A 2/1996 Stent et al. ..... 379/265
5,496,392 A 3/1996 Sims et al.
5,497,317 A 3/1996 Hawkins et al.
5,497,371 A 3/1996 Ellis et al.
5,497,373 A 3/1996 Hulen et al.
5,500,889 A 3/1996 Baker et al.
5,500,891 A 3/1996 Harrington et al.
5,506,898 A 4/1996 Costantini et al.
5,509,062 A 4/1996 Carlsen
5,510,829 A 4/1996 Sugiyama et al.
5,511,117 A 4/1996 Zazzera
5,517,620 A 5/1996 Hashimoto et al.
5,519,773 A 5/1996 Dumas et al.
5,524,047 A 6/1996 Brown et al.
5,524,147 A 6/1996 Bean
5,526,353 A 6/1996 Henley et al.
5,528,678 A 6/1996 Kaplan
5,530,740 A 6/1996 Irribarren et al.
5,530,744 A 6/1996 Charalambous et al.
5,533,103 A 7/1996 Peavey et al.
5,533,107 A 7/1996 Irwin et al.
5,533,108 A 7/1996 Harris et al.
5,533,110 A 7/1996 Pinard et al.
5,533,115 A 7/1996 Hollenbach et al.
5,535,211 A 7/1996 Yano
5,535,256 A 7/1996 Maloney et al.
5,535,323 A 7/1996 Miller et al.
5,537,470 A 7/1996 Lee
5,537,630 A 7/1996 Berry et al.
5,539,811 A 7/1996 Nakamura et al.
5,544,220 A 8/1996 Trefzger ..... 379/266
5,546,452 A 8/1996 Andrews et al.
5,550,816 A 8/1996 Hardwick et al.
5,553,133 A 9/1996 Perkins
5,555,299 A 9/1996 Maloney et al.
5,555,426 A 9/1996 Johnson et al.
5,557,667 A 9/1996 Bruno et al.
5,559,868 A 9/1996 Blonder
5,559,877 A 9/1996 Ash et al.
5,559,878 A 9/1996 Keys et al.
5,561,711 A 10/1996 Muller
5,561,841 A 10/1996 Markus
5,563,805 A 10/1996 Arbuckle et al.
5,563,937 A 10/1996 Bruno et al.
5,566,294 A 10/1996 Kojima et al.
5,570,419 A 10/1996 Cave et al.
5,570,420 A 10/1996 Bress et al.
5,572,579 A 11/1996 Orriss et al.
5,572,643 A 11/1996 Judson
5,577,100 A 11/1996 McGregor et al.
5,577,105 A 11/1996 Baum et al.
5,583,862 A 12/1996 Callon
5,583,922 A 12/1996 Davis et al.
5,590,188 A 12/1996 Crockett ..... 379/225
5,592,542 A 1/1997 Honda et al.
5,592,543 A 1/1997 Smith et al.
5,594,791 A 1/1997 Szlam et al.
5,598,532 A 1/1997 Liron
5,604,737 A 2/1997 Iwami et al.
5,606,602 A 2/1997 Johnson et al.
5,608,778 A 3/1997 Partridge, III
5,608,786 A 3/1997 Gordon
5,610,910 A 3/1997 Focsaneanu et al.
5,617,570 A 4/1997 Russell et al.
5,619,183 A 4/1997 Ziegra et al.
5,619,557 A 4/1997 Van Berkum
5,619,648 A 4/1997 Canale et al.
5,621,789 A 4/1997 McCalmont et al.
5,621,790 A 4/1997 Grossman et al. ..... 379/266
5,623,600 A 4/1997 Ji et al.
5,624,265 A 4/1997 Redford et al.
5,625,404 A 4/1997 Grady et al.
5,625,676 A 4/1997 Greco et al.
5,625,682 A 4/1997 Gray et al.
5,627,764 A 5/1997 Schutzman et al.
5,627,884 A 5/1997 Williams et al.
5,630,127 A 5/1997 Moore et al.
5,632,011 A 5/1997 Landfield et al.
5,633,920 A 5/1997 Kikinis et al.
5,633,924 A 5/1997 Kaish et al. ..... 379/266
5,635,918 A 6/1997 Tett
5,640,445 A 6/1997 David
5,642,411 A 6/1997 Theis
5,642,477 A 6/1997 de Carmo et al.
5,642,511 A 6/1997 Chow et al.
5,644,720 A 7/1997 Boll et al.
5,646,981 A 7/1997 Klein
5,649,105 A 7/1997 Aldred et al.
5,652,785 A 7/1997 Richardson, Jr. et al.
5,652,789 A 7/1997 Miner et al.
5,652,791 A 7/1997 Sunderman et al.
5,654,961 A 8/1997 Araujo et al.
5,655,015 A 8/1997 Walsh et al.
5,657,383 A 8/1997 Gerber et al.
5,659,542 A 8/1997 Bell et al.
5,659,604 A 8/1997 Beckmann
5,659,746 A 8/1997 Bankert et al.
5,673,304 A 9/1997 Connor et al.
5,673,311 A 9/1997 Andruska et al.
5,673,322 A 9/1997 Pepe et al.
5,675,637 A * 10/1997 Szlam et al. ..... H04M 3/51 379/114.19
5,684,870 A 11/1997 Maloney et al.
5,689,229 A 11/1997 Chaco et al.
5,692,033 A 11/1997 Farris
5,696,809 A 12/1997 Voit
5,696,811 A 12/1997 Maloney et al.
5,701,400 A 12/1997 Amado
5,703,943 A 12/1997 Otto
5,706,453 A 1/1998 Cheng et al.
5,708,702 A 1/1998 De Paul et al.
5,712,901 A 1/1998 Meermans
5,715,306 A 2/1998 Sunderman et al.
5,715,307 A 2/1998 Zazzera
5,715,432 A 2/1998 Xu et al.
5,717,747 A 2/1998 Boyle, III et al.
5,721,770 A 2/1998 Kohler
5,724,412 A 3/1998 Srinivasan
5,724,418 A 3/1998 Brady
5,726,984 A 3/1998 Kubler et al.
5,727,159 A 3/1998 Kikinis
5,729,594 A 3/1998 Klingman
5,732,078 A 3/1998 Arango
5,734,981 A 3/1998 Kennedy, III et al.
5,737,495 A 4/1998 Adams et al.
5,737,595 A 4/1998 Cohen et al.
5,737,691 A 4/1998 Wang et al.
5,737,726 A 4/1998 Cameron et al.
5,737,727 A 4/1998 Lehmann et al.
5,740,238 A 4/1998 Flockhart et al.
5,740,240 A 4/1998 Jolissaint
5,742,668 A 4/1998 Pepe et al.
5,742,670 A 4/1998 Bennett
5,742,675 A 4/1998 Kilander et al.
5,742,905 A 4/1998 Pepe et al.
5,745,687 A 4/1998 Randell
5,745,878 A 4/1998 Hashimoto et al.
5,748,884 A 5/1998 Royce et al.
5,748,907 A 5/1998 Crane
5,751,706 A 5/1998 Land et al.

(56) References Cited

U.S. PATENT DOCUMENTS 5,751,707 A 5/1998 Voit et al.
5,751,795 A 5/1998 Hassler et al.
5,752,059 A 5/1998 Holleran et al.
5,752,244 A 5/1998 Rose et al.
5,752,246 A 5/1998 Rogers et al.
5,754,111 A 5/1998 Garcia
5,754,636 A 5/1998 Bayless et al.
5,754,639 A 5/1998 Flockhart et al.
5,754,655 A 5/1998 Hughes et al.
5,757,904 A 5/1998 Anderson
5,760,823 A 6/1998 Brunson et al.
5,761,289 A 6/1998 Keshav
5,764,736 A 6/1998 Shachar et al.
5,764,898 A 6/1998 Tsuji et al.
5,765,033 A 6/1998 Miloslavsky
5,768,360 A 6/1998 Reynolds et al.
5,768,527 A 6/1998 Zhu et al.
5,774,583 A 6/1998 Sasaki et al.
5,778,060 A 7/1998 Otto
5,778,178 A 7/1998 Arunachalam
5,778,377 A 7/1998 Marlin et al.
5,784,438 A 7/1998 Martinez
5,784,451 A 7/1998 Smith, Jr.
5,784,452 A 7/1998 Carney
5,787,160 A 7/1998 Chaney et al.
5,787,163 A 7/1998 Taylor et al.
5,790,635 A 8/1998 Dezonno
5,790,650 A 8/1998 Dunn et al.
5,790,789 A 8/1998 Suarez
5,790,798 A 8/1998 Beckett, II et al.
5,793,857 A 8/1998 Barnes et al.
5,793,861 A 8/1998 Haigh
5,794,039 A 8/1998 Guck
5,796,398 A 8/1998 Zimmer
5,796,729 A 8/1998 Greaney et al.
5,796,791 A 8/1998 Polcyn ..... 379/265
5,796,813 A 8/1998 Sonnenberg
5,799,067 A 8/1998 Kikinis et al.
5,799,297 A 8/1998 Goodridge et al.
5,802,163 A 9/1998 Miloslavsky
5,802,253 A 9/1998 Gross et al.
5,802,283 A 9/1998 Grady et al.
5,802,314 A 9/1998 Tullis et al.
5,802,316 A 9/1998 Ito et al.
5,802,493 A 9/1998 Sheflott et al.
5,802,526 A 9/1998 Fawcett et al.
5,805,587 A 9/1998 Norris et al.
5,806,061 A 9/1998 Chaudhuri et al.
5,809,128 A 9/1998 McMullin
5,809,282 A 9/1998 Cooper et al.
5,809,512 A 9/1998 Kato
5,812,795 A 9/1998 Horovitz et al.
5,813,014 A 9/1998 Gustman
5,815,566 A 9/1998 Ramot et al.
5,818,935 A 10/1998 Maa
5,822,306 A 10/1998 Catchpole
5,822,400 A 10/1998 Smith
5,822,404 A 10/1998 Cave
5,822,526 A 10/1998 Waskiewicz
5,825,775 A 10/1998 Chin et al.
5,825,862 A 10/1998 Voit et al.
5,825,869 A 10/1998 Brooks et al.
5,825,870 A 10/1998 Miloslavsky
5,826,040 A 10/1998 Fargher et al.
5,826,269 A 10/1998 Hussey
5,828,747 A 10/1998 Fisher et al.
5,828,839 A 10/1998 Moncreiff
5,831,611 A 11/1998 Kennedy et al.
5,832,196 A 11/1998 Croslin et al.
5,835,090 A 11/1998 Clark et al.
5,835,570 A 11/1998 Wattenbarger
5,835,583 A 11/1998 Hetz et al.
5,838,682 A 11/1998 Dekelbaum et al.
5,838,768 A 11/1998 Sumar et al.
5,838,773 A 11/1998 Eisner et al.
5,838,774 A 11/1998 Weisser, Jr.
5,841,854 A 11/1998 Schumacher et al.
5,842,131 A 11/1998 Yamane
5,844,980 A 12/1998 Patel et al.
5,844,982 A 12/1998 Knitl
5,847,484 A 12/1998 Kuyama et al.
5,848,131 A 12/1998 Shaffer et al.
5,848,143 A 12/1998 Andrews et al.
5,850,433 A 12/1998 Rondeau
5,852,814 A 12/1998 Allen
5,857,184 A 1/1999 Lynch
5,862,134 A 1/1999 Deng
5,862,211 A 1/1999 Roush
5,862,223 A 1/1999 Walker et al.
5,864,616 A 1/1999 Hartmeier
5,864,848 A 1/1999 Horvitz et al.
5,867,484 A 2/1999 Shaunfield
5,867,494 A 2/1999 Krishnaswamy et al.
5,867,495 A 2/1999 Elliott et al.
5,867,559 A 2/1999 Jorgensen et al.
5,867,562 A 2/1999 Scherer
5,867,822 A 2/1999 Sankar
5,870,464 A 2/1999 Brewster et al.
5,870,549 A 2/1999 Bobo, II
5,872,841 A 2/1999 King et al.
5,872,926 A 2/1999 Levac et al.
5,873,032 A 2/1999 Cox et al.
5,873,040 A 2/1999 Dunn et al.
5,873,076 A 2/1999 Barr et al.
5,878,126 A 3/1999 Velamuri et al.
5,878,130 A 3/1999 Andrews et al.
5,878,230 A 3/1999 Weber et al.
5,881,146 A 3/1999 Hamilton
5,883,891 A 3/1999 Williams et al.
5,884,032 A 3/1999 Bateman et al.
5,884,262 A 3/1999 Wise et al.
5,887,173 A 3/1999 Ogawa et al.
5,889,474 A 3/1999 LaDue
5,889,774 A 3/1999 Mirashrafi et al.
5,889,799 A 3/1999 Grossman et al. ..... 379/266
5,889,863 A 3/1999 Weber
5,892,764 A 4/1999 Riemann et al.
5,892,822 A 4/1999 Gottlieb et al.
5,893,912 A 4/1999 Freund et al.
5,894,512 A 4/1999 Zenner
5,896,444 A 4/1999 Perlman et al.
5,897,635 A 4/1999 Torres et al.
5,901,138 A 5/1999 Bader et al.
5,901,203 A 5/1999 Morganstein et al.
5,901,209 A 5/1999 Tannenbaum et al.
5,903,631 A 5/1999 Smith et al.
5,903,877 A 5/1999 Berkowitz et al.
5,905,495 A 5/1999 Tanaka et al.
5,905,792 A 5/1999 Miloslavsky
5,905,793 A 5/1999 Flockhart et al.
5,905,863 A 5/1999 Knowles et al.
5,907,547 A 5/1999 Foladare et al.
5,911,134 A 6/1999 Castonguay et al.
5,911,776 A 6/1999 Guck
5,914,941 A 6/1999 Janky
5,915,001 A 6/1999 Uppaluru
5,915,008 A 6/1999 Dulman
5,915,011 A 6/1999 Miloslavsky
5,915,012 A 6/1999 Miloslavsky
5,916,302 A 6/1999 Dunn et al.
5,917,817 A 6/1999 Dunn et al.
5,917,898 A 6/1999 Bassa et al.
5,918,213 A 6/1999 Bernard et al.
5,920,621 A 7/1999 Gottlieb
5,920,719 A 7/1999 Sutton et al.
5,920,865 A 7/1999 Ariga
5,923,745 A 7/1999 Hurd
5,923,879 A 7/1999 Sasmazel et al.
5,926,535 A 7/1999 Reynolds
5,926,538 A 7/1999 Deryugin et al.
5,926,539 A 7/1999 Shtivelman
5,933,492 A 8/1999 Turovski
5,937,051 A 8/1999 Hurd et al.
5,937,057 A 8/1999 Bell et al.

(56) References Cited

U.S. PATENT DOCUMENTS 5,937,162 A 8/1999 Funk et al.
5,937,388 A 8/1999 Davis et al.
5,938,725 A 8/1999 Hara
5,940,075 A 8/1999 Mutschler, III et al.
5,940,478 A 8/1999 Vaudreuil et al.
5,940,479 A 8/1999 Guy et al.
5,940,488 A 8/1999 DeGrazia et al.
5,940,495 A 8/1999 Bondarenko et al.
5,940,496 A 8/1999 Gisby et al.
5,940,497 A 8/1999 Miloslavsky
5,940,598 A 8/1999 Strauss et al.
5,940,823 A 8/1999 Schreiber et al.
5,943,416 A 8/1999 Gisby
5,946,375 A 8/1999 Pattison et al.
5,946,386 A 8/1999 Rogers et al.
5,946,387 A 8/1999 Miloslavsky
5,946,388 A 8/1999 Walker et al.
5,948,054 A 9/1999 Nielsen
5,949,988 A 9/1999 Feisullin et al.
5,953,332 A 9/1999 Miloslavsky
5,953,405 A 9/1999 Miloslavsky
5,953,406 A 9/1999 LaRue et al.
5,956,482 A 9/1999 Agraharam et al.
5,956,729 A 9/1999 Goetz et al.
5,958,014 A 9/1999 Cave
5,958,016 A 9/1999 Chang et al.
5,958,064 A 9/1999 Judd et al.
5,959,982 A 9/1999 Federkins et al.
5,960,073 A 9/1999 Kikinis et al.
5,960,411 A 9/1999 Hartman et al.
5,963,632 A 10/1999 Miloslavsky
5,963,635 A 10/1999 Szlam et al.
5,966,427 A 10/1999 Shaffer et al.
5,966,695 A 10/1999 Melchione et al.
5,970,065 A 10/1999 Miloslavsky
5,970,134 A 10/1999 Highland et al.
5,974,135 A 10/1999 Breneman et al.
5,974,414 A 10/1999 Stanczak et al.
5,974,444 A 10/1999 Konrad
5,974,448 A 10/1999 Yamauchi et al.
RE36,416 E 11/1999 Szlam et al.
5,978,465 A 11/1999 Corduroy et al.
5,978,467 A 11/1999 Walker et al.
5,978,672 A 11/1999 Hartmaier et al.
5,978,836 A 11/1999 Ouchi
5,982,774 A 11/1999 Foladare et al.
5,982,870 A 11/1999 Pershan et al.
5,982,873 A 11/1999 Flockhart et al.
5,983,218 A 11/1999 Syeda-Mahmood
5,987,102 A 11/1999 Elliott et al.
5,987,117 A 11/1999 McNeil et al.
5,987,118 A 11/1999 Dickerman et al.
5,987,423 A 11/1999 Arnold et al.
5,987,446 A 11/1999 Corey et al.
5,991,365 A 11/1999 Pizano et al.
5,991,390 A 11/1999 Booton
5,991,391 A 11/1999 Miloslavsky
5,991,392 A 11/1999 Miloslavsky
5,991,393 A 11/1999 Kamen
5,991,394 A 11/1999 Dezonno et al.
5,991,395 A 11/1999 Miloslavsky
5,995,606 A 11/1999 Civanlar et al.
5,995,610 A 11/1999 Smidt et al.
5,995,614 A 11/1999 Miloslavsky
5,995,615 A 11/1999 Miloslavsky
5,996,000 A 11/1999 Shuster
5,999,525 A 12/1999 Krishnaswamy et al.
5,999,609 A 12/1999 Nishimura
5,999,965 A 12/1999 Kelly
6,002,396 A 12/1999 Davies
6,002,760 A 12/1999 Gisby
6,003,034 A 12/1999 Tuli
6,005,845 A 12/1999 Svennesson et al.
6,005,920 A 12/1999 Fuller et al.
6,005,931 A 12/1999 Neyman et al.
6,009,163 A 12/1999 Nabkel et al.
6,009,469 A 12/1999 Mattaway et al.
6,011,792 A 1/2000 Miloslavsky
6,011,844 A 1/2000 Uppaluru et al.
6,011,974 A 1/2000 Cedervall et al.
6,012,152 A 1/2000 Douik et al.
6,014,137 A 1/2000 Burns
6,014,138 A 1/2000 Cain et al.
6,014,379 A 1/2000 White et al.
6,014,437 A 1/2000 Acker et al.
6,014,647 A 1/2000 Nizzari et al.
6,014,711 A 1/2000 Brown
6,018,578 A 1/2000 Bondarenko et al.
6,018,579 A 1/2000 Petrunka
6,018,761 A 1/2000 Uomini
6,021,262 A 2/2000 Cote et al.
6,021,411 A 2/2000 Brophy et al.
6,021,428 A 2/2000 Miloslavsky
6,023,684 A 2/2000 Pearson
6,023,723 A 2/2000 McCormick et al.
6,026,087 A 2/2000 Mirashrafi et al.
6,026,375 A 2/2000 Hall et al.
6,028,917 A 2/2000 Creamer et al.
6,029,195 A 2/2000 Herz
6,038,293 A 3/2000 McNerney et al.
6,038,537 A 3/2000 Matsuoka
6,041,116 A 3/2000 Meyers
6,044,142 A 3/2000 Hammarstrom et al.
6,044,144 A 3/2000 Becker et al.
6,044,146 A 3/2000 Gisby et al.
6,044,368 A 3/2000 Powers
6,046,762 A 4/2000 Sonesh et al.
6,047,060 A 4/2000 Fedorov et al.
6,049,272 A 4/2000 Lee et al.
6,049,547 A 4/2000 Fisher et al.
6,049,779 A 4/2000 Berkson
6,052,514 A 4/2000 Gill et al.
6,055,307 A 4/2000 Behnke et al.
6,055,308 A 4/2000 Miloslavsky et al.
6,055,513 A 4/2000 Katz et al.
6,058,163 A 5/2000 Pattison et al.
6,058,389 A 5/2000 Chandra et al.
6,058,435 A 5/2000 Sassin et al.
6,061,054 A 5/2000 Jolly
6,064,667 A 5/2000 Gisby et al.
6,064,722 A 5/2000 Clise et al.
6,064,723 A 5/2000 Cohn et al.
6,064,730 A 5/2000 Ginsberg
6,064,973 A 5/2000 Smith et al.
6,067,357 A 5/2000 Kishinsky et al.
6,069,890 A 5/2000 White et al.
6,070,142 A 5/2000 McDonough et al.
6,070,144 A 5/2000 Ginsberg et al.
6,072,864 A 6/2000 Shtivelman et al.
6,073,013 A 6/2000 Agre et al.
6,073,105 A 6/2000 Sutcliffe et al.
6,073,109 A 6/2000 Flores et al.
6,073,124 A 6/2000 Krishnan et al.
6,075,783 A 6/2000 Voit
6,075,843 A 6/2000 Cave
6,076,101 A 6/2000 Kamakura et al.
6,076,105 A 6/2000 Wolff et al.
6,076,109 A 6/2000 Kikinis
6,078,581 A 6/2000 Shtivelman et al.
6,078,583 A 6/2000 Takahara et al.
6,081,591 A 6/2000 Skoog
6,081,592 A 6/2000 Battle
6,085,097 A 7/2000 Savery et al.
6,085,201 A 7/2000 Tso
6,088,340 A 7/2000 Buchholz et al.
6,088,696 A 7/2000 Moon et al.
6,088,717 A 7/2000 Reed et al.
6,094,479 A 7/2000 Lindeberg et al.
6,094,673 A 7/2000 Dilip et al.
6,097,792 A 8/2000 Thornton
6,097,804 A 8/2000 Gilbert et al.
6,097,938 A 8/2000 Paxson
6,098,065 A 8/2000 Skillen et al.
6,101,473 A 8/2000 Scott et al.

(56) References Cited

U.S. PATENT DOCUMENTS

| | | | |
|---|---|---|---|
| 6,104,711 | A | 8/2000 | Voit |
| 6,104,800 | A | 8/2000 | Benson |
| 6,104,801 | A | 8/2000 | Miloslavsky |
| 6,104,802 | A | 8/2000 | Perlmutter |
| 6,108,688 | A | 8/2000 | Nielsen |
| 6,108,704 | A | 8/2000 | Hutton et al. |
| 6,108,711 | A | 8/2000 | Beck et al. |
| 6,112,085 | A | 8/2000 | Garner et al. |
| 6,115,596 | A | 9/2000 | Raith et al. |
| 6,115,742 | A | 9/2000 | Franklin et al. |
| 6,118,865 | A | 9/2000 | Gisby |
| 6,119,155 | A | 9/2000 | Rossmann et al. |
| 6,119,167 | A | 9/2000 | Boyle et al. |
| 6,122,360 | A | 9/2000 | Neyman et al. |
| 6,122,364 | A | 9/2000 | Petrunka et al. |
| 6,122,365 | A | 9/2000 | Yegoshin |
| 6,122,632 | A | 9/2000 | Botts et al. |
| 6,125,113 | A | 9/2000 | Farris et al. |
| 6,125,126 | A | 9/2000 | Hallenstål |
| 6,128,379 | A | 10/2000 | Smyk |
| 6,128,482 | A | 10/2000 | Nixon et al. |
| 6,128,603 | A | 10/2000 | Dent et al. |
| 6,128,646 | A | 10/2000 | Miloslavsky |
| 6,130,933 | A | 10/2000 | Miloslavsky |
| 6,134,217 | A | 10/2000 | Stiliadis et al. |
| 6,134,235 | A | 10/2000 | Goldman et al. |
| 6,134,315 | A | 10/2000 | Galvin |
| 6,134,318 | A | 10/2000 | O'Neil |
| 6,134,530 | A | 10/2000 | Bunting et al. |
| 6,137,870 | A | 10/2000 | Scherer |
| 6,138,139 | A | 10/2000 | Beck et al. |
| 6,141,345 | A | 10/2000 | Goeddel et al. |
| 6,148,074 | A | 11/2000 | Miloslavsky et al. |
| 6,157,653 | A | 12/2000 | Kline et al. |
| 6,157,655 | A | 12/2000 | Shtivelman |
| 6,157,924 | A | 12/2000 | Austin |
| 6,166,735 | A | 12/2000 | Dom et al. |
| 6,167,255 | A | 12/2000 | Kennedy, III et al. |
| 6,167,395 | A | 12/2000 | Beck et al. |
| 6,167,404 | A | 12/2000 | Morcos et al. |
| 6,170,011 | B1 | 1/2001 | Macleod Beck et al. |
| 6,173,052 | B1 | 1/2001 | Brady |
| 6,173,316 | B1 | 1/2001 | De Boor et al. |
| 6,175,562 | B1 | 1/2001 | Cave |
| 6,175,563 | B1 | 1/2001 | Miloslavsky |
| 6,175,564 | B1 | 1/2001 | Miloslavsky et al. |
| 6,175,620 | B1 | 1/2001 | Rouge et al. |
| 6,175,842 | B1 | 1/2001 | Kirk et al. |
| 6,178,239 | B1 | 1/2001 | Kishinsky et al. |
| 6,181,336 | B1 | 1/2001 | Chiu et al. |
| 6,181,736 | B1 | 1/2001 | McLaughlin et al. |
| 6,181,788 | B1 | 1/2001 | Miloslavsky |
| 6,182,059 | B1 | 1/2001 | Angotti et al. |
| 6,182,249 | B1 | 1/2001 | Wookey et al. |
| 6,185,184 | B1 | 2/2001 | Mattaway et al. |
| 6,185,287 | B1 | 2/2001 | Miloslavsky |
| 6,185,291 | B1 | 2/2001 | Miloslavsky |
| 6,185,292 | B1 | 2/2001 | Miloslavsky |
| 6,185,427 | B1 | 2/2001 | Krasner et al. |
| 6,185,535 | B1 | 2/2001 | Hedin et al. |
| 6,188,688 | B1 | 2/2001 | Buskirk, Jr. |
| 6,188,762 | B1 | 2/2001 | Shooster |
| 6,192,122 | B1 | 2/2001 | Flockhart et al. |
| 6,192,250 | B1 | 2/2001 | Buskens et al. |
| 6,192,338 | B1 | 2/2001 | Haszto et al. |
| 6,195,357 | B1 | 2/2001 | Polcyn |
| 6,198,738 | B1 | 3/2001 | Chang et al. |
| 6,198,739 | B1 | 3/2001 | Neyman et al. |
| 6,201,804 | B1 | 3/2001 | Kikinis |
| 6,201,863 | B1 | 3/2001 | Miloslavsky |
| 6,205,135 | B1 | 3/2001 | Chinni et al. |
| 6,205,412 | B1 | 3/2001 | Barskiy et al. |
| 6,212,178 | B1 | 4/2001 | Beck et al. |
| 6,215,783 | B1 | 4/2001 | Neyman |
| 6,219,045 | B1 | 4/2001 | Leahy et al. |
| 6,219,413 | B1 | 4/2001 | Burg |
| 6,222,919 | B1 | 4/2001 | Hollatz et al. |
| 6,226,285 | B1 | 5/2001 | Kozdon et al. |
| 6,229,524 | B1 | 5/2001 | Chernock et al. |
| 6,229,888 | B1 | 5/2001 | Miloslavsky |
| 6,230,197 | B1 | 5/2001 | Beck et al. |
| 6,233,234 | B1 | 5/2001 | Curry et al. |
| 6,233,616 | B1 | 5/2001 | Reid |
| 6,236,857 | B1 | 5/2001 | Calabrese et al. |
| 6,240,285 | B1 | 5/2001 | Blum et al. |
| 6,243,092 | B1 | 6/2001 | Okita et al. |
| 6,243,373 | B1 | 6/2001 | Turock |
| 6,243,375 | B1 | 6/2001 | Speicher |
| 6,243,379 | B1 | 6/2001 | Veerina et al. |
| 6,243,713 | B1 | 6/2001 | Nelson et al. |
| 6,249,807 | B1 | 6/2001 | Shaw et al. |
| 6,253,129 | B1 | 6/2001 | Jenkins et al. |
| 6,256,489 | B1 | 7/2001 | Lichter et al. |
| 6,256,503 | B1 | 7/2001 | Stephens |
| 6,259,692 | B1 | 7/2001 | Shtivelman et al. |
| 6,259,774 | B1 | 7/2001 | Miloslavsky |
| 6,259,786 | B1 | 7/2001 | Gisby |
| 6,263,049 | B1 | 7/2001 | Kuhn |
| 6,263,065 | B1 | 7/2001 | Durinovic-Johri et al. |
| 6,263,066 | B1 | 7/2001 | Shtivelman et al. |
| 6,263,359 | B1 | 7/2001 | Fong et al. |
| 6,275,693 | B1 | 8/2001 | Lin et al. |
| 6,278,976 | B1 | 8/2001 | Kochian |
| 6,278,996 | B1 | 8/2001 | Richardson et al. |
| 6,282,429 | B1 | 8/2001 | Baiyor et al. |
| 6,282,565 | B1 | 8/2001 | Shaw et al. |
| 6,285,316 | B1 | 9/2001 | Nir et al. |
| 6,285,364 | B1 | 9/2001 | Giordano, III et al. |
| 6,286,033 | B1 | 9/2001 | Kishinsky et al. |
| 6,286,084 | B1 | 9/2001 | Wexler et al. |
| 6,286,129 | B1 | 9/2001 | Agarwal et al. |
| 6,289,094 | B1 | 9/2001 | Miloslavsky |
| 6,292,181 | B1 | 9/2001 | Banerjee et al. |
| 6,292,553 | B1 | 9/2001 | Fellingham et al. |
| 6,295,353 | B1 | 9/2001 | Flockhart et al. |
| 6,295,530 | B1 | 9/2001 | Ritchie et al. |
| 6,298,041 | B1 | 10/2001 | Packer |
| 6,301,480 | B1 | 10/2001 | Kennedy, III et al. |
| 6,304,898 | B1 | 10/2001 | Shiigi |
| 6,314,089 | B1 | 11/2001 | Szlam et al. |
| 6,314,430 | B1 | 11/2001 | Chang |
| 6,320,857 | B1 | 11/2001 | Tonnby et al. |
| 6,320,951 | B1 | 11/2001 | Shtivelman et al. |
| 6,324,276 | B1 | 11/2001 | Uppaluru et al. |
| 6,330,323 | B1 | 12/2001 | Gottlieb et al. |
| 6,330,426 | B2 | 12/2001 | Brown et al. |
| 6,332,022 | B1 | 12/2001 | Martinez |
| 6,332,154 | B2 | 12/2001 | Beck et al. |
| 6,332,163 | B1 | 12/2001 | Bowman-Amuah |
| 6,333,980 | B1 | 12/2001 | Hollatz et al. |
| 6,335,927 | B1 | 1/2002 | Elliott et al. |
| 6,337,904 | B1 | 1/2002 | Gisby |
| 6,339,593 | B1 | 1/2002 | Kikinis |
| 6,341,128 | B1 | 1/2002 | Svedberg |
| 6,343,281 | B1 | 1/2002 | Kato |
| 6,345,290 | B2 | 2/2002 | Okada et al. |
| 6,345,300 | B1 | 2/2002 | Bakshi et al. |
| 6,345,305 | B1 | 2/2002 | Beck et al. |
| 6,346,952 | B1 | 2/2002 | Shtivelman |
| 6,347,085 | B2 | 2/2002 | Kelly |
| 6,353,608 | B1 | 3/2002 | Cullers et al. |
| 6,353,667 | B1 | 3/2002 | Foster et al. |
| 6,359,981 | B1 | 3/2002 | Neyman et al. |
| 6,362,838 | B1 | 3/2002 | Szlam et al. |
| 6,363,411 | B1 | 3/2002 | Dugan et al. |
| 6,366,575 | B1 | 4/2002 | Barkan et al. |
| 6,366,586 | B1 | 4/2002 | Christie |
| 6,366,651 | B1 | 4/2002 | Griffith et al. |
| 6,366,656 | B1 | 4/2002 | Lee et al. |
| 6,366,658 | B1 | 4/2002 | Bjornberg et al. |
| 6,366,663 | B1 | 4/2002 | Bauer et al. |
| 6,366,925 | B1 | 4/2002 | Meltzer et al. |
| 6,370,238 | B1 | 4/2002 | Sansone et al. |
| 6,370,508 | B2 | 4/2002 | Beck et al. |

(56) References Cited

U.S. PATENT DOCUMENTS

| | | | |
|---|---|---|---|
| 6,370,567 | B1 | 4/2002 | Ouchi |
| 6,373,836 | B1 | 4/2002 | Deryugin et al. |
| 6,373,937 | B1 | 4/2002 | Yegoshin |
| 6,377,568 | B1 | 4/2002 | Kelly |
| 6,377,583 | B1 | 4/2002 | Lyles et al. |
| 6,377,944 | B1 | 4/2002 | Busey et al. |
| 6,377,975 | B1 | 4/2002 | Florman |
| 6,381,640 | B1 | 4/2002 | Beck et al. |
| 6,385,191 | B1 | 5/2002 | Coffman et al. |
| 6,385,202 | B1 | 5/2002 | Katseff et al. |
| 6,385,646 | B1 | 5/2002 | Brown et al. |
| 6,389,007 | B1 | 5/2002 | Shenkman et al. |
| 6,389,133 | B1 | 5/2002 | Kamen |
| 6,393,018 | B2 | 5/2002 | Miloslavsky |
| 6,393,122 | B1 | 5/2002 | Belzile |
| 6,393,278 | B1 | 5/2002 | Buchanan et al. |
| 6,393,481 | B1 | 5/2002 | Deo et al. |
| 6,396,834 | B1 | 5/2002 | Bonomi et al. |
| 6,396,919 | B1 | 5/2002 | Shimada et al. |
| 6,400,725 | B1 | 6/2002 | Ross |
| 6,401,066 | B1 | 6/2002 | McIntosh |
| 6,401,094 | B1 | 6/2002 | Stemp et al. |
| 6,405,033 | B1 | 6/2002 | Kennedy, III et al. |
| 6,407,996 | B1 | 6/2002 | Witchalls |
| 6,407,999 | B1 | 6/2002 | Olkkonen et al. |
| 6,408,064 | B1 | 6/2002 | Fedorov et al. |
| 6,411,806 | B1 | 6/2002 | Garner et al. |
| 6,418,146 | B1 | 7/2002 | Miloslavsky |
| 6,418,199 | B1 | 7/2002 | Perrone |
| 6,424,709 | B1 | 7/2002 | Doyle et al. |
| 6,427,002 | B2 | 7/2002 | Campbell et al. |
| 6,430,174 | B1 | 8/2002 | Jennings et al. |
| 6,430,282 | B1 | 8/2002 | Bannister et al. |
| 6,434,231 | B2 | 8/2002 | Neyman et al. |
| 6,434,530 | B1 | 8/2002 | Sloane et al. |
| 6,434,549 | B1 | 8/2002 | Linetsky et al. |
| 6,442,242 | B1 | 8/2002 | McAllister et al. |
| 6,442,247 | B1 | 8/2002 | Garcia |
| 6,445,788 | B1 | 9/2002 | Torba |
| 6,449,260 | B1 | 9/2002 | Sassin et al. |
| 6,449,270 | B1 | 9/2002 | Miloslavsky |
| 6,449,358 | B1 | 9/2002 | Anisimov et al. |
| 6,449,646 | B1 | 9/2002 | Sikora et al. |
| 6,452,609 | B1 | 9/2002 | Katinsky et al. |
| 6,453,038 | B1 | 9/2002 | McFarlane et al. |
| 6,453,341 | B1 | 9/2002 | Miloslavsky |
| 6,456,615 | B1 | 9/2002 | Kikinis |
| 6,456,619 | B1 | 9/2002 | Sassin et al. |
| 6,459,697 | B1 | 10/2002 | Neyman |
| 6,463,148 | B1 | 10/2002 | Brady |
| 6,470,010 | B1 | 10/2002 | Szviatovszki et al. |
| 6,470,080 | B2 | 10/2002 | Perlmutter |
| 6,473,787 | B2 | 10/2002 | Miloslavsky |
| 6,480,600 | B1 | 11/2002 | Neyman et al. |
| 6,487,663 | B1 | 11/2002 | Jaisimha et al. |
| 6,489,954 | B1 | 12/2002 | Powlette |
| 6,490,350 | B2 | 12/2002 | McDuff et al. |
| 6,493,353 | B2 | 12/2002 | Kelly et al. |
| 6,493,433 | B2 | 12/2002 | Clabaugh et al. |
| 6,493,447 | B1 | 12/2002 | Goss et al. |
| 6,496,567 | B1 | 12/2002 | Bjornberg et al. |
| 6,496,702 | B1 | 12/2002 | Lockhart |
| 6,496,981 | B1 | 12/2002 | Wistendahl et al. |
| 6,498,897 | B1 | 12/2002 | Nelson et al. |
| 6,499,088 | B1 | 12/2002 | Wexler et al. |
| 6,512,825 | B1 | 1/2003 | Lindholm et al. |
| 6,515,996 | B1 | 2/2003 | Tonnby et al. |
| 6,519,246 | B1 | 2/2003 | Strahs |
| 6,519,617 | B1 | 2/2003 | Wanderski et al. |
| 6,532,493 | B1 | 3/2003 | Aviani, Jr. et al. |
| 6,535,492 | B2 | 3/2003 | Shtivelman |
| 6,535,601 | B1 | 3/2003 | Flockhart et al. |
| 6,536,043 | B1 | 3/2003 | Guedalia |
| 6,539,419 | B2 | 3/2003 | Beck et al. |
| 6,546,405 | B2 | 4/2003 | Gupta et al. |
| 6,549,539 | B1 | 4/2003 | Neyman |
| 6,553,114 | B1 | 4/2003 | Fisher et al. |
| 6,554,183 | B1 | 4/2003 | Sticha et al. |
| 6,560,328 | B1 | 5/2003 | Bondarenko et al. |
| 6,560,329 | B1 | 5/2003 | Draginich et al. |
| 6,560,607 | B1 | 5/2003 | Lassesen |
| 6,563,788 | B1 | 5/2003 | Torba et al. |
| 6,567,854 | B1 | 5/2003 | Olshansky et al. |
| 6,581,105 | B2 | 6/2003 | Miloslavsky et al. |
| 6,594,269 | B1 | 7/2003 | Polcyn |
| 6,594,347 | B1 | 7/2003 | Calder et al. |
| 6,597,685 | B2 | 7/2003 | Miloslavsky et al. |
| 6,600,733 | B2 | 7/2003 | Deng |
| 6,600,822 | B2 | 7/2003 | Kamen |
| 6,603,762 | B1 | 8/2003 | Kikinis |
| 6,603,854 | B1 | 8/2003 | Judkins et al. |
| 6,611,498 | B1 | 8/2003 | Baker et al. |
| 6,611,590 | B1 | 8/2003 | Lu et al. |
| 6,614,780 | B2 | 9/2003 | Hakim et al. |
| 6,614,781 | B1 | 9/2003 | Elliott et al. |
| 6,625,139 | B2 | 9/2003 | Miloslavsky et al. |
| 6,628,666 | B1 | 9/2003 | Pickering et al. |
| 6,631,399 | B1 | 10/2003 | Stanczak et al. |
| 6,633,910 | B1 | 10/2003 | Rajan et al. |
| 6,650,747 | B1 | 11/2003 | Bala et al. |
| 6,651,085 | B1 | 11/2003 | Woods |
| 6,658,389 | B1 | 12/2003 | Alpdemir |
| 6,661,882 | B1 | 12/2003 | Muir et al. |
| 6,665,395 | B1 | 12/2003 | Busey et al. |
| 6,665,396 | B1 | 12/2003 | Khouri et al. |
| 6,668,286 | B2 | 12/2003 | Bateman et al. |
| 6,678,718 | B1 | 1/2004 | Khouri et al. |
| 6,681,010 | B1 | 1/2004 | Anderson et al. |
| 6,687,241 | B1 | 2/2004 | Goss |
| 6,690,788 | B1 | 2/2004 | Bauer et al. |
| 6,693,893 | B1 | 2/2004 | Ehlinger |
| 6,704,394 | B1 | 3/2004 | Kambhatla et al. |
| 6,704,409 | B1 | 3/2004 | Dilip et al. |
| 6,704,410 | B1 | 3/2004 | McFarlane et al. |
| 6,704,411 | B1 | 3/2004 | Nishidate |
| 6,707,903 | B2 | 3/2004 | Burok et al. |
| 6,711,249 | B2 | 3/2004 | Weissman et al. |
| 6,711,611 | B2 | 3/2004 | Hanhan |
| 6,714,643 | B1 | 3/2004 | Gargeya et al. |
| 6,718,032 | B1 | 4/2004 | Vrenjak et al. |
| 6,718,366 | B2 | 4/2004 | Johnstone et al. |
| 6,721,306 | B1 | 4/2004 | Farris et al. |
| 6,731,626 | B1 | 5/2004 | Neyman |
| 6,735,298 | B2 | 5/2004 | Neyman et al. |
| 6,744,877 | B1 | 6/2004 | Edwards |
| 6,744,878 | B1 | 6/2004 | Komissarchik et al. |
| 6,748,211 | B1 | 6/2004 | Isaac et al. |
| 6,751,210 | B1 | 6/2004 | Shaffer et al. |
| 6,753,784 | B1 | 6/2004 | Sznaider et al. |
| 6,754,181 | B1 | 6/2004 | Elliott et al. |
| 6,760,322 | B1 | 7/2004 | Fukuda et al. |
| 6,760,324 | B1 | 7/2004 | Scott et al. |
| 6,760,428 | B2 | 7/2004 | Foster |
| 6,760,727 | B1 | 7/2004 | Schroeder et al. |
| 6,763,104 | B1 | 7/2004 | Judkins et al. |
| 6,763,369 | B1 | 7/2004 | Ytuarte et al. |
| 6,771,765 | B1 | 8/2004 | Crowther et al. |
| 6,778,527 | B1 | 8/2004 | Amin |
| 6,785,375 | B1 | 8/2004 | Beddus et al. |
| 6,785,710 | B2 | 8/2004 | Kikinis |
| 6,785,740 | B1 | 8/2004 | Yoneda et al. |
| 6,788,779 | B2 | 9/2004 | Ostapchuck |
| 6,798,771 | B1 | 9/2004 | Low et al. |
| 6,801,520 | B2 | 10/2004 | Philonenko |
| 6,801,928 | B2 | 10/2004 | Nuestro |
| 6,804,346 | B1 | 10/2004 | Mewhinney |
| 6,816,871 | B2 | 11/2004 | Lee |
| 6,816,878 | B1 | 11/2004 | Zimmers et al. |
| 6,823,197 | B1 | 11/2004 | Chen et al. |
| 6,829,349 | B1 | 12/2004 | Neale et al. |
| 6,845,154 | B1 | 1/2005 | Cave et al. |
| 6,847,715 | B1 | 1/2005 | Swartz |
| 6,847,825 | B1 | 1/2005 | Duvall et al. |
| 6,850,602 | B1 | 2/2005 | Chou |

(56) References Cited

U.S. PATENT DOCUMENTS 6,850,614 B1 2/2005 Collins
6,859,529 B2 2/2005 Duncan et al.
6,865,267 B2 3/2005 Dezonno
6,868,391 B1 3/2005 Hultgren
6,874,119 B2 3/2005 Macleod Beck et al.
6,876,632 B1 4/2005 Takeda
6,879,586 B2 4/2005 Miloslavsky et al.
6,882,996 B2 4/2005 Preisig et al.
6,898,190 B2 5/2005 Shtivelman et al.
6,903,685 B1 6/2005 Arndt et al.
6,907,112 B1 6/2005 Guedalia et al.
6,907,455 B1 6/2005 Wolfe et al.
6,910,072 B2 6/2005 Macleod Beck et al.
6,912,272 B2 6/2005 Kirk et al.
6,922,411 B1 7/2005 Taylor
6,922,689 B2 7/2005 Shtivelman
6,925,161 B2 8/2005 Burg et al.
6,934,379 B2 8/2005 Falcon et al.
6,934,381 B1 8/2005 Klein et al.
6,944,272 B1 9/2005 Thomas
6,958,994 B2 10/2005 Zhakov et al.
6,965,870 B1 11/2005 Petras et al.
6,965,914 B2 11/2005 Dowling
6,970,844 B1 11/2005 Bierenbaum
6,977,740 B1 12/2005 Mandalia
6,981,020 B2 12/2005 Miloslavsky et al.
6,985,478 B2 1/2006 Pogossiants et al.
6,985,943 B2 1/2006 Deryugin et al.
6,987,977 B2 1/2006 Lockhart
6,996,603 B1 2/2006 Srinivasan
7,006,614 B2 2/2006 Feinberg et al.
7,020,264 B1 3/2006 Neyman et al.
7,031,442 B1 4/2006 Neyman et al.
7,036,128 B1 4/2006 Julia et al.
7,039,176 B2 5/2006 Borodow et al.
7,039,857 B2 5/2006 Beck et al.
7,076,048 B2 7/2006 Lee et al.
7,079,641 B2 7/2006 Ostapchuck
7,080,092 B2 7/2006 Upton
7,088,814 B1 8/2006 Shaffer et al.
7,092,509 B1 8/2006 Mears et al.
7,106,850 B2 9/2006 Campbell et al.
7,110,523 B2 9/2006 Gagle et al.
7,110,525 B1 9/2006 Heller et al.
7,117,244 B2 10/2006 Florman et al.
7,120,700 B2 10/2006 Macleod Beck et al.
7,127,400 B2 10/2006 Koch
7,133,830 B1 11/2006 Hoban et al.
7,136,475 B1 11/2006 Rogers et al.
7,155,496 B2 12/2006 Froyd et al.
7,155,512 B2 12/2006 Lean et al.
7,159,224 B2 1/2007 Sharma et al.
7,167,924 B1 1/2007 Symonds et al.
7,184,747 B2 2/2007 Bogat
7,216,350 B2 5/2007 Martin et al.
7,221,377 B1 5/2007 Okita et al.
7,222,301 B2 5/2007 Makagon et al.
7,231,032 B2 6/2007 Nevman et al.
7,236,486 B2 6/2007 Baker et al.
7,236,584 B2 6/2007 Torba
7,242,760 B2 7/2007 Shires
7,245,641 B2 7/2007 Kim et al.
7,245,711 B2 7/2007 Margolis
7,246,009 B2 7/2007 Hamblen et al.
7,254,219 B1 8/2007 Hansen et al.
7,254,641 B2 8/2007 Broughton et al.
7,263,372 B2 8/2007 Lockhart
7,263,671 B2 8/2007 Hull et al.
7,269,263 B2 9/2007 Dedieu et al.
7,272,627 B2 9/2007 Petrovykh
7,277,424 B1 10/2007 Dowling
7,277,536 B2 10/2007 Ostapchuk
7,277,916 B2 10/2007 Nuestro
7,283,519 B2 10/2007 Girard
7,336,649 B1 2/2008 Huang
7,363,228 B2 4/2008 Wyss et al.
7,372,956 B1 5/2008 Kikinis et al.
7,373,405 B2 5/2008 Deryugin et al.
7,373,410 B2 5/2008 Monza et al.
7,376,227 B2 5/2008 Anisimov et al.
7,376,431 B2 5/2008 Niedermeyer
7,401,112 B1 7/2008 Matz et al.
7,415,009 B2 8/2008 Neyman
7,418,094 B2 8/2008 Golitsin et al.
7,428,303 B2 9/2008 Campbell et al.
7,434,204 B1 10/2008 Everingham et al.
7,457,279 B1 11/2008 Scott et al.
7,460,496 B2 12/2008 Miloslavsky et al.
7,496,640 B2 2/2009 Hanhan
7,535,479 B2 5/2009 Okita et al.
7,558,383 B2 7/2009 Shtivelman et al.
7,561,887 B2 7/2009 Lockhart
7,564,840 B2 7/2009 Elliott et al.
7,565,428 B2 7/2009 Deryugin et al.
7,609,829 B2 10/2009 Wang et al.
7,610,347 B2 10/2009 Petrovykh
7,619,996 B2 11/2009 Miloslavsky et al.
7,653,744 B2 1/2010 Kanefsky et al.
7,669,182 B2 2/2010 Garcia
7,672,998 B1 3/2010 Haskins et al.
7,706,520 B1 4/2010 Waterson et al.
7,715,332 B2 5/2010 Miloslavsky et al.
7,716,292 B2 5/2010 Kikinis
7,739,325 B1 6/2010 Okita et al.
7,764,231 B1 7/2010 Karr et al.
7,769,161 B1 8/2010 Hession et al.
7,779,067 B2 8/2010 Beck et al.
7,792,773 B2 9/2010 McCord et al.
7,808,977 B2 10/2010 Kikinis
7,823,167 B2 10/2010 Makagon et al.
7,853,717 B2 12/2010 Petrovykh
7,856,095 B2 12/2010 Brown
7,903,807 B2 3/2011 Neyman et al.
7,907,598 B2 3/2011 Anisimov et al.
7,929,978 B2 4/2011 Lockhart
7,957,401 B2 6/2011 Zalenski et al.
8,009,821 B1 8/2011 Apparao et al.
8,018,921 B2 9/2011 Pogossiants et al.
8,024,401 B1 9/2011 Gurbani et al.
8,031,698 B2 10/2011 Neyman
8,036,214 B2 10/2011 Elliott et al.
8,059,812 B1 11/2011 Bundy
8,068,598 B1 11/2011 Russi et al.
8,085,761 B2 12/2011 Elliott et al.
8,089,958 B2 1/2012 Elliott et al.
8,126,133 B1 2/2012 Everingham et al.
8,130,749 B2 3/2012 Kikinis
8,180,662 B2 5/2012 Minert et al.
8,180,666 B2 5/2012 Minert et al.
8,199,891 B2 6/2012 Brown et al.
8,209,207 B2 6/2012 Minert et al.
8,209,209 B2 6/2012 Minert et al.
8,223,948 B2 7/2012 Minert et al.
8,226,477 B1 7/2012 Machado et al.
8,254,404 B2 8/2012 Rabenko et al.
8,254,558 B2 8/2012 Minert et al.
8,270,421 B2 9/2012 Elliott et al.
8,275,111 B2 9/2012 Golitsin et al.
8,345,856 B1 1/2013 Anisimov et al.
8,351,595 B2 1/2013 Peterson et al.
8,358,769 B2 1/2013 Neyman et al.
8,395,994 B2 3/2013 Stevenson et al.
8,396,205 B1 3/2013 Lowry et al.
8,411,844 B1 4/2013 Anisimov et al.
8,693,347 B2 4/2014 Elliott et al.
9,002,920 B2 4/2015 Deryugin et al.
RE45,583 E 6/2015 Lockhart
9,118,781 B1 8/2015 Kavulak et al.
9,241,258 B2 1/2016 Ku et al.
9,247,053 B1 1/2016 Bruce et al.
2001/0000458 A1 4/2001 Shtivelman et al.
2001/0001150 A1 5/2001 Miloslavsky
2001/0005382 A1 6/2001 Cave et al.
2001/0008555 A1 7/2001 Bae et al.

(56) References Cited

U.S. PATENT DOCUMENTS

2001/0011366 A1 8/2001 Beck et al.
2001/0013041 A1 8/2001 Macleod Beck et al.
2001/0014604 A1 8/2001 Kingdon et al.
2001/0023430 A1 9/2001 Srinivasan
2001/0023448 A1 9/2001 Hanhan
2001/0024497 A1 9/2001 Campbell et al.
2001/0025309 A1 9/2001 Macleod Beck et al.
2001/0028649 A1 10/2001 Pogossiants et al.
2001/0029519 A1 10/2001 Hallinan et al.
2001/0037316 A1 11/2001 Shiloh
2001/0038624 A1 11/2001 Greenberg et al.
2001/0040887 A1 11/2001 Shtivelman et al.
2001/0042095 A1 11/2001 Kim et al.
2001/0043586 A1 11/2001 Miloslavsky
2001/0043589 A1 11/2001 Kikinis
2001/0044676 A1 11/2001 Macleod Beck et al.
2001/0044828 A1 11/2001 Kikinis
2001/0047262 A1 11/2001 Kurganov et al.
2001/0054064 A1 12/2001 Kannan
2002/0001300 A1 1/2002 Miloslavsky et al.
2002/0012428 A1 1/2002 Neyman et al.
2002/0013150 A1 1/2002 McKenna et al.
2002/0019844 A1 2/2002 Kurowski et al.
2002/0019846 A1 2/2002 Miloslavsky et al.
2002/0025819 A1 2/2002 Cetusic et al.
2002/0035647 A1 3/2002 Brown et al.
2002/0037076 A1 3/2002 Perlmutter
2002/0041674 A1 4/2002 Kamen
2002/0054579 A1 5/2002 Miloslavsky
2002/0055853 A1 5/2002 Macleod Beck et al.
2002/0056000 A1 5/2002 Albert Coussement
2002/0057671 A1 5/2002 Kikinis
2002/0059164 A1 5/2002 Shtivelman
2002/0059374 A1 5/2002 Nuestro
2002/0060988 A1 5/2002 Shtivelman
2002/0062385 A1 5/2002 Dowling
2002/0064149 A1 5/2002 Elliott et al.
2002/0071529 A1 6/2002 Nelkenbaum
2002/0076031 A1 6/2002 Falcon et al.
2002/0078150 A1 6/2002 Thompson et al.
2002/0087648 A1 7/2002 Petrovykh
2002/0091527 A1 7/2002 Shiau
2002/0091726 A1 7/2002 Macleod Beck et al.
2002/0095462 A1 7/2002 Beck et al.
2002/0097708 A1 7/2002 Deng
2002/0099738 A1 7/2002 Grant
2002/0101866 A1 8/2002 Miloslavsky et al.
2002/0101880 A1 8/2002 Kim
2002/0103998 A1 8/2002 DeBruine
2002/0105957 A1 8/2002 Bondarenko et al.
2002/0114278 A1 8/2002 Coussement
2002/0114441 A1 8/2002 Coussement
2002/0120719 A1 8/2002 Lee et al.
2002/0123899 A1 9/2002 Hall et al.
2002/0126678 A1 9/2002 Kelly et al.
2002/0126828 A1 9/2002 Kamen
2002/0131399 A1 9/2002 Philonenko
2002/0136167 A1 9/2002 Steele et al.
2002/0150311 A1 10/2002 Lynn
2002/0169834 A1 11/2002 Miloslavsky et al.
2002/0174436 A1 11/2002 Wu et al.
2002/0176404 A1 11/2002 Girard
2003/0002479 A1 1/2003 Vortman et al.
2003/0002652 A1 1/2003 Neyman et al.
2003/0002654 A1 1/2003 Torba
2003/0007621 A1 1/2003 Graves et al.
2003/0009530 A1 1/2003 Philonenko et al.
2003/0018702 A1 1/2003 Broughton et al.
2003/0018729 A1 1/2003 Miloslavsky
2003/0021259 A1 1/2003 Miloslavsky et al.
2003/0021406 A1 1/2003 Ostapchuck
2003/0026414 A1 2/2003 Baker et al.
2003/0037113 A1 2/2003 Petrovykh
2003/0043832 A1 3/2003 Anisimov et al.
2003/0051037 A1 3/2003 Sundaram et al.
2003/0055884 A1 3/2003 Yuen et al.
2003/0058884 A1 3/2003 Kallner et al.
2003/0084128 A1 5/2003 Anderson et al.
2003/0084349 A1 5/2003 Friedrichs et al.
2003/0088421 A1 5/2003 Maes et al.
2003/0097457 A1 5/2003 Saran et al.
2003/0099343 A1 5/2003 Dezonno
2003/0115353 A1 6/2003 Deryugin et al.
2003/0125048 A1 7/2003 Lockhart
2003/0135592 A1 7/2003 Vetter et al.
2003/0161296 A1 8/2003 Butler et al.
2003/0161448 A1 8/2003 Parolkar et al.
2003/0179729 A1 9/2003 MacLeod Beck et al.
2003/0212558 A1 11/2003 Matula
2003/0216923 A1 11/2003 Gilmore et al.
2003/0219029 A1 11/2003 Pickett
2003/0220875 A1 11/2003 Lam et al.
2003/0229529 A1 12/2003 Mui et al.
2004/0006739 A1 1/2004 Mulligan
2004/0017797 A1 1/2004 Chen et al.
2004/0019638 A1 1/2004 Makagon et al.
2004/0030557 A1 2/2004 Culy et al.
2004/0047302 A1 3/2004 Dezonno et al.
2004/0054743 A1 3/2004 McPartlan et al.
2004/0064348 A1 4/2004 Humenansky et al.
2004/0081183 A1 4/2004 Monza et al.
2004/0083195 A1 4/2004 McCord et al.
2004/0083281 A1 4/2004 Makagon et al.
2004/0083479 A1 4/2004 Bondarenko et al.
2004/0083482 A1 4/2004 Makagon et al.
2004/0102977 A1 5/2004 Metzler et al.
2004/0107025 A1 6/2004 Ransom et al.
2004/0111269 A1 6/2004 Koch
2004/0120502 A1 6/2004 Strathmeyer et al.
2004/0169675 A1 9/2004 Beck et al.
2004/0179516 A1 9/2004 Neyman
2004/0181574 A1 9/2004 Hanhan
2004/0199580 A1 10/2004 Zhakov et al.
2004/0208134 A1 10/2004 Neyman et al.
2004/0208309 A1 10/2004 Miloslavsky
2004/0213400 A1 10/2004 Golitsin et al.
2004/0223490 A1 11/2004 Donovan et al.
2004/0264678 A1 12/2004 Ostapchuck
2004/0267892 A1 12/2004 Kikinis
2005/0013417 A1 1/2005 Zimmers et al.
2005/0033851 A1 2/2005 Kikinis
2005/0041678 A1 2/2005 Nuestro
2005/0128961 A1 6/2005 Miloslavsky et al.
2005/0147090 A1 7/2005 MacLeod Beck et al.
2005/0154792 A1 7/2005 Deryugin et al.
2005/0207559 A1 9/2005 Shtivelman et al.
2006/0029206 A1 2/2006 Anisimov et al.
2006/0034262 A1 2/2006 Pogossiants et al.
2006/0079250 A1 4/2006 Lockhart
2006/0080107 A1 4/2006 Hill et al.
2006/0095568 A1 5/2006 Makagon et al.
2006/0109976 A1 5/2006 Sundaram et al.
2006/0133594 A1 6/2006 Neyman et al.
2006/0153173 A1 7/2006 Beck et al.
2006/0209797 A1 9/2006 Anisimov et al.
2006/0210047 A1 9/2006 Neyman et al.
2006/0245421 A1 11/2006 Ostapchuk
2007/0002744 A1 1/2007 Mewhinney et al.
2007/0041525 A1 2/2007 Tingley et al.
2007/0041567 A1 2/2007 Anisimov et al.
2007/0071224 A1 3/2007 Shtivelman et al.
2007/0110043 A1 5/2007 Girard
2007/0127707 A1 6/2007 Koser et al.
2007/0143301 A1 6/2007 Tran
2007/0195940 A1 8/2007 Miloslavsky et al.
2007/0213073 A1 9/2007 Lockhart
2007/0274495 A1 11/2007 Youd et al.
2008/0002822 A1 1/2008 Petrovykh
2008/0013531 A1 1/2008 Elliott et al.
2008/0025295 A1 1/2008 Elliott et al.
2008/0034354 A1 2/2008 Brughton et al.
2008/0043728 A1 2/2008 Miloslavsky et al.
2008/0043955 A1 2/2008 Shtivelman et al.
2008/0043975 A1 2/2008 Miloslavsky et al.

(56) References Cited

U.S. PATENT DOCUMENTS

| | | | |
|---|---|---|---|
| 2008/0043977 | A1 | 2/2008 | Neyman et al. |
| 2008/0046504 | A1 | 2/2008 | Deryugin et al. |
| 2008/0046531 | A1 | 2/2008 | Shtivelman et al. |
| 2008/0049731 | A1 | 2/2008 | Kikinis |
| 2008/0049737 | A1 | 2/2008 | Neyman |
| 2008/0049928 | A1 | 2/2008 | Miloslavsky et al. |
| 2008/0049929 | A1 | 2/2008 | Miloslavsky et al. |
| 2008/0062971 | A1 | 3/2008 | Kikinis |
| 2008/0130844 | A1 | 6/2008 | Hubbard et al. |
| 2008/0205378 | A1 | 8/2008 | Wyss et al. |
| 2008/0222240 | A1 | 9/2008 | Deryugin et al. |
| 2008/0285739 | A1 | 11/2008 | Golitsin et al. |
| 2009/0089136 | A1 | 4/2009 | Minert et al. |
| 2009/0089451 | A1 | 4/2009 | Petrovykh |
| 2009/0227267 | A1 | 9/2009 | Lockhart |
| 2009/0240346 | A1 | 9/2009 | Cadigan, Jr. et al. |
| 2010/0106710 | A1 | 4/2010 | Nishizawa et al. |
| 2010/0157979 | A1 | 6/2010 | Anisimov et al. |
| 2010/0198930 | A1 | 8/2010 | Kikinis |
| 2011/0099602 | A1 | 4/2011 | Apparao et al. |
| 2011/0110363 | A1 | 5/2011 | Anandani |
| 2011/0178946 | A1 | 7/2011 | Minert et al. |
| 2011/0179304 | A1 | 7/2011 | Peterson |
| 2011/0179398 | A1 | 7/2011 | Peterson |
| 2011/0182418 | A1 | 7/2011 | Anisimov et al. |
| 2012/0047266 | A1 | 2/2012 | Minert |
| 2012/0066016 | A1 | 3/2012 | Minert et al. |
| 2012/0177195 | A1 | 7/2012 | Elliott et al. |
| 2012/0195415 | A1 | 8/2012 | Wyss et al. |
| 2012/0250849 | A1 | 10/2012 | Liu et al. |
| 2013/0016115 | A1 | 1/2013 | Minert et al. |
| 2013/0070757 | A1 | 3/2013 | Elliott et al. |
| 2013/0129067 | A1 | 5/2013 | Neyman et al. |
| 2013/0230160 | A1 | 9/2013 | Neyman et al. |
| 2014/0376708 | A1 | 12/2014 | Deryugin et al. |
| 2014/0379936 | A1 | 12/2014 | Anisimov et al. |
| 2015/0201021 | A1 | 7/2015 | Beck et al. |
| 2015/0244870 | A1 | 8/2015 | Neyman et al. |

FOREIGN PATENT DOCUMENTS

| | | | |
|---|---|---|---|
| AT | 316736 | | 2/2006 |
| AT | 317621 | | 2/2006 |
| AT | 318048 | | 3/2006 |
| AT | 337678 | | 9/2006 |
| AT | 379921 | | 12/2007 |
| AT | 380434 | | 12/2007 |
| AT | 384398 | | 2/2008 |
| AT | 388578 | | 3/2008 |
| AT | 401736 | | 8/2008 |
| AT | 413059 | | 11/2008 |
| AT | 424090 | | 3/2009 |
| AT | 465451 | | 5/2010 |
| AT | 474415 | | 7/2010 |
| AU | 2604797 | | 10/1997 |
| AU | 718233 | B2 | 3/1998 |
| AU | 5274398 | | 3/1998 |
| AU | 6023598 | | 8/1998 |
| AU | 6034698 | | 8/1998 |
| AU | 6167398 | | 8/1998 |
| AU | 6319498 | | 8/1998 |
| AU | 6655298 | | 9/1998 |
| AU | 6655398 | | 9/1998 |
| AU | 7099298 | | 10/1998 |
| AU | 735134 | B2 | 3/1999 |
| AU | 736449 | B2 | 4/1999 |
| AU | 737483 | B2 | 4/1999 |
| AU | 743217 | B2 | 4/1999 |
| AU | 745404 | B2 | 4/1999 |
| AU | 748636 | B2 | 4/1999 |
| AU | 9225198 | | 4/1999 |
| AU | 9228098 | | 4/1999 |
| AU | 9381998 | | 4/1999 |
| AU | 9479298 | | 4/1999 |
| AU | 743880 | B2 | 5/1999 |
| AU | 1118899 | | 5/1999 |
| AU | 740090 | B2 | 6/1999 |
| AU | 743737 | B2 | 6/1999 |
| AU | 744340 | B2 | 6/1999 |
| AU | 1120099 | | 6/1999 |
| AU | 1276799 | | 6/1999 |
| AU | 1286299 | | 6/1999 |
| AU | 741437 | B2 | 8/1999 |
| AU | 758713 | B2 | 8/1999 |
| AU | 2595499 | | 8/1999 |
| AU | 2595599 | | 8/1999 |
| AU | 2667299 | | 8/1999 |
| AU | 2674899 | | 8/1999 |
| AU | 739979 | B2 | 9/1999 |
| AU | 2674799 | | 9/1999 |
| AU | 749023 | B2 | 12/1999 |
| AU | 4427299 | | 12/1999 |
| AU | 4819499 | | 12/1999 |
| AU | 746085 | B2 | 1/2000 |
| AU | 4426799 | | 1/2000 |
| AU | 750215 | B2 | 4/2000 |
| AU | 754238 | B2 | 4/2000 |
| AU | 755234 | B2 | 4/2000 |
| AU | 5807099 | | 4/2000 |
| AU | 5810599 | | 4/2000 |
| AU | 5813699 | | 4/2000 |
| AU | 748456 | B2 | 5/2000 |
| AU | 751143 | B2 | 5/2000 |
| AU | 751232 | B2 | 5/2000 |
| AU | 751269 | B2 | 5/2000 |
| AU | 751301 | B2 | 5/2000 |
| AU | 755138 | B2 | 5/2000 |
| AU | 1233800 | | 5/2000 |
| AU | 1327200 | | 5/2000 |
| AU | 1328200 | | 5/2000 |
| AU | 1328300 | | 5/2000 |
| AU | 1454700 | | 5/2000 |
| AU | 1717700 | | 5/2000 |
| AU | 1718600 | | 5/2000 |
| AU | 2045900 | | 6/2000 |
| AU | 748447 | B2 | 7/2000 |
| AU | 3113800 | | 7/2000 |
| AU | 2964900 | | 9/2000 |
| AU | 3470800 | | 9/2000 |
| AU | 4507700 | | 2/2001 |
| AU | 6798300 | | 4/2001 |
| AU | 1077201 | | 6/2001 |
| AU | 1077301 | | 6/2001 |
| AU | 8006800 | | 6/2001 |
| AU | 4732501 | | 10/2001 |
| AU | 5384201 | | 10/2001 |
| AU | 5724801 | | 11/2001 |
| AU | 756656 | B2 | 1/2003 |
| AU | 2003300117 | | 8/2004 |
| BR | 9913621 | A | 5/2001 |
| BR | 9913622 | A | 5/2001 |
| CA | 2178705 | A1 | 3/1997 |
| CA | 2391428 | A1 | 3/1997 |
| CA | 2259912 | C | 1/1998 |
| CA | 2280002 | A1 | 8/1998 |
| CA | 2289193 | A1 | 12/1998 |
| CA | 2289198 | A1 | 12/1998 |
| CA | 2302397 | A1 | 3/1999 |
| CA | 2302488 | A1 | 3/1999 |
| CA | 2302674 | A1 | 3/1999 |
| CA | 2302680 | A1 | 3/1999 |
| CA | 2302704 | A1 | 3/1999 |
| CA | 2302678 | A1 | 4/1999 |
| CA | 2308590 | A1 | 5/1999 |
| CA | 2309185 | A1 | 5/1999 |
| CA | 2309186 | A1 | 5/1999 |
| CA | 2309183 | A1 | 6/1999 |
| CA | 2320978 | A1 | 8/1999 |
| CA | 2320979 | A1 | 8/1999 |
| CA | 2320989 | A1 | 8/1999 |
| CA | 2330608 | A1 | 12/1999 |
| CA | 2334513 | A1 | 12/1999 |
| CA | 2343286 | A1 | 3/2000 |
| CA | 2343288 | A1 | 3/2000 |

(56) References Cited

FOREIGN PATENT DOCUMENTS

| | | | |
|---|---|---|---|
| CA | 2343756 | A1 | 3/2000 |
| CA | 2347721 | A1 | 5/2000 |
| CA | 2348567 | A1 | 5/2000 |
| CA | 2348574 | A1 | 5/2000 |
| CA | 2348575 | C | 5/2000 |
| CA | 2348994 | A1 | 5/2000 |
| CA | 2348999 | A1 | 5/2000 |
| CA | 2350515 | A1 | 5/2000 |
| CA | 2352973 | A1 | 6/2000 |
| CA | 2362172 | A1 | 8/2000 |
| CA | 2313596 | A1 | 2/2001 |
| CN | 1282484 | A | 1/2001 |
| CN | 1282485 | A | 1/2001 |
| CN | 1285990 | A | 2/2001 |
| CN | 1285991 | A | 2/2001 |
| CN | 1293798 | A | 5/2001 |
| CN | 1293858 | A | 5/2001 |
| CN | 1298590 | A | 6/2001 |
| CN | 1309861 | A | 8/2001 |
| CN | 1310822 | A | 8/2001 |
| CN | 1323418 | A | 11/2001 |
| CN | 1323421 | A | 11/2001 |
| CN | 1354942 | A | 6/2002 |
| CN | 1130061 | C | 12/2003 |
| CN | 1132399 | C | 12/2003 |
| CN | 1145314 | C | 4/2004 |
| CN | 1149521 | C | 5/2004 |
| CN | 1152549 | C | 6/2004 |
| CN | 1512724 | A | 7/2004 |
| CN | 1520197 | A | 8/2004 |
| CN | 1197336 | C | 4/2005 |
| CN | 1200548 | C | 5/2005 |
| CN | 1662025 | A | 8/2005 |
| CN | 1232077 | C | 12/2005 |
| CN | 1756280 | A | 4/2006 |
| CN | 100477702 | C | 4/2009 |
| CN | 100547568 | C | 10/2009 |
| CN | 102257789 | A | 11/2011 |
| CN | 101635775 | B | 12/2011 |
| DE | 60011863 | T2 | 12/2004 |
| DE | 69730498 | T2 | 9/2005 |
| DE | 60015236 | T2 | 2/2006 |
| DE | 69832275 | T2 | 8/2006 |
| DE | 69833285 | T2 | 9/2006 |
| DE | 69833394 | T2 | 10/2006 |
| DE | 69833462 | T2 | 10/2006 |
| DE | 69833935 | T2 | 11/2006 |
| DE | 60214191 | T2 | 12/2006 |
| DE | 69834184 | T2 | 3/2007 |
| DE | 69838795 | T2 | 10/2008 |
| DE | 69838814 | T2 | 11/2008 |
| DE | 69839022 | T2 | 1/2009 |
| DE | 69839222 | T2 | 3/2009 |
| EP | 0193961 | A2 | 9/1986 |
| EP | 0236013 | A2 | 9/1987 |
| EP | 0376517 | A2 | 7/1990 |
| EP | 0420779 | A2 | 4/1991 |
| EP | 0424015 | A2 | 4/1991 |
| EP | 0425161 | A2 | 5/1991 |
| EP | 0425163 | A2 | 5/1991 |
| EP | 0515068 | A2 | 11/1992 |
| EP | 0528732 | A1 | 2/1993 |
| EP | 0532972 | A1 | 3/1993 |
| EP | 0539105 | A2 | 4/1993 |
| EP | 0559979 | A2 | 9/1993 |
| EP | 0568770 | A2 | 11/1993 |
| EP | 0610625 | A2 | 8/1994 |
| EP | 0647050 | A2 | 4/1995 |
| EP | 0647051 | A1 | 4/1995 |
| EP | 0660573 | A2 | 6/1995 |
| EP | 0701358 | A1 | 3/1996 |
| EP | 0705017 | A2 | 4/1996 |
| EP | 0721268 | A2 | 7/1996 |
| EP | 0725526 | A2 | 8/1996 |
| EP | 0734187 | A2 | 9/1996 |
| EP | 0740450 | A2 | 10/1996 |
| EP | 0748102 | A2 | 12/1996 |
| EP | 0753956 | A2 | 1/1997 |
| EP | 0755146 | A2 | 1/1997 |
| EP | 0758175 | A1 | 2/1997 |
| EP | 0771095 | A2 | 5/1997 |
| EP | 0792076 | A2 | 8/1997 |
| EP | 0806858 | A2 | 11/1997 |
| EP | 0817455 | A2 | 1/1998 |
| EP | 0856980 | A2 | 8/1998 |
| EP | 0863651 | A2 | 9/1998 |
| EP | 0866407 | A1 | 9/1998 |
| EP | 0869639 | A2 | 10/1998 |
| EP | 0883306 | A2 | 12/1998 |
| EP | 0908047 | A1 | 4/1999 |
| EP | 0958560 | A1 | 11/1999 |
| EP | 0962087 | A1 | 12/1999 |
| EP | 1006706 | A2 | 6/2000 |
| EP | 1013062 | A1 | 6/2000 |
| EP | 1013066 | A1 | 6/2000 |
| EP | 1016280 | A1 | 7/2000 |
| EP | 1044553 | A1 | 10/2000 |
| EP | 1064630 | A1 | 1/2001 |
| EP | 1066712 | A1 | 1/2001 |
| EP | 1075153 | A2 | 2/2001 |
| EP | 1087597 | A2 | 3/2001 |
| EP | 1088277 | A1 | 4/2001 |
| EP | 1092313 | A1 | 4/2001 |
| EP | 1107555 | A2 | 6/2001 |
| EP | 1114543 | A1 | 7/2001 |
| EP | 1125214 | A1 | 8/2001 |
| EP | 1133677 | A2 | 9/2001 |
| EP | 1133736 | A1 | 9/2001 |
| EP | 1133742 | A1 | 9/2001 |
| EP | 1145153 | A1 | 10/2001 |
| EP | 1145154 | A1 | 10/2001 |
| EP | 1163564 | A2 | 12/2001 |
| EP | 1193961 | A2 | 4/2002 |
| EP | 1227635 | A2 | 7/2002 |
| EP | 1248447 | A2 | 10/2002 |
| EP | 1290861 | A1 | 3/2003 |
| EP | 1292901 | A1 | 3/2003 |
| EP | 1292939 | A1 | 3/2003 |
| EP | 1328121 | A1 | 7/2003 |
| EP | 0873642 | B1 | 4/2004 |
| EP | 1413954 | A2 | 4/2004 |
| EP | 1107615 | B1 | 6/2004 |
| EP | 1033024 | A4 | 9/2004 |
| EP | 1129545 | A1 | 9/2004 |
| EP | 1061723 | B1 | 10/2004 |
| EP | 1465397 | A1 | 10/2004 |
| EP | 1469663 | A1 | 10/2004 |
| EP | 1484903 | A2 | 12/2004 |
| EP | 1566949 | A1 | 8/2005 |
| EP | 0985308 | B1 | 11/2005 |
| EP | 1359735 | B1 | 1/2006 |
| EP | 1357729 | B1 | 2/2006 |
| EP | 1377001 | B1 | 2/2006 |
| EP | 0954922 | B1 | 3/2006 |
| EP | 0986875 | B1 | 4/2006 |
| EP | 1410614 | B1 | 8/2006 |
| EP | 1774760 | A2 | 4/2007 |
| EP | 1021905 | B1 | 11/2007 |
| EP | 1031232 | B1 | 12/2007 |
| EP | 1865697 | A3 | 12/2007 |
| EP | 1040638 | B1 | 1/2008 |
| EP | 1048162 | B1 | 3/2008 |
| EP | 1157509 | B1 | 7/2008 |
| EP | 1337079 | B1 | 9/2008 |
| EP | 1326415 | B1 | 10/2008 |
| EP | 1013054 | B1 | 2/2009 |
| EP | 1333653 | B1 | 4/2009 |
| EP | 0983676 | B1 | 6/2009 |
| EP | 1125208 | B1 | 4/2010 |
| EP | 1142284 | B1 | 7/2010 |
| EP | 2380323 | A1 | 10/2011 |
| EP | 1408678 | B1 | 11/2011 |
| EP | 1057301 | B1 | 8/2013 |
| EP | 1131728 | B1 | 1/2014 |

(56) References Cited

FOREIGN PATENT DOCUMENTS

| | | | |
|---|---|---|---|
| EP | 1625460 | B1 | 5/2014 |
| ES | 2231120 | T3 | 5/2005 |
| ES | 2255657 | T3 | 7/2006 |
| ES | 2256666 | T3 | 7/2006 |
| ES | 2257639 | T3 | 8/2006 |
| FR | 2671252 | A1 | 7/1992 |
| GB | 2273225 | A | 6/1994 |
| GB | 2306853 | A | 5/1997 |
| GB | 2315190 | A | 1/1998 |
| GB | 2324627 | A | 10/1998 |
| GB | 2369263 | A | 5/2002 |
| JP | 61-51247 | | 3/1986 |
| JP | 62-200956 | | 9/1987 |
| JP | 63-149955 | | 6/1988 |
| JP | 64-7460 | | 1/1989 |
| JP | 64-77265 | | 3/1989 |
| JP | 02-170756 | | 7/1990 |
| JP | 02-298154 | | 12/1990 |
| JP | 03-052443 | | 3/1991 |
| JP | 03-160865 | | 7/1991 |
| JP | 03-177144 | | 8/1991 |
| JP | 04-40723 | | 2/1992 |
| JP | 4-66858 | | 6/1992 |
| JP | 04-265049 | | 9/1992 |
| JP | 4-336742 | | 11/1992 |
| JP | 04-371056 | | 12/1992 |
| JP | 06-044157 | | 2/1994 |
| JP | 06-046150 | | 2/1994 |
| JP | 06-066830 | | 3/1994 |
| JP | 06-069988 | | 3/1994 |
| JP | 06-83771 | | 3/1994 |
| JP | 06-90292 | | 3/1994 |
| JP | 06-103058 | | 4/1994 |
| JP | 06-121051 | | 4/1994 |
| JP | 06-284203 | | 7/1994 |
| JP | 06-261129 | | 9/1994 |
| JP | 06-291877 | | 10/1994 |
| JP | 06-334748 | | 12/1994 |
| JP | 07-046321 | | 2/1995 |
| JP | 07-058851 | | 3/1995 |
| JP | 07-115471 | | 5/1995 |
| JP | 07-170288 | | 7/1995 |
| JP | 07-170546 | | 7/1995 |
| JP | 07-262104 | | 10/1995 |
| JP | 07-212471 | | 11/1995 |
| JP | 07-319538 | | 12/1995 |
| JP | 07-336447 | | 12/1995 |
| JP | 08-46699 | | 2/1996 |
| JP | 08-056377 | | 2/1996 |
| JP | 08-163252 | | 6/1996 |
| JP | 08-181793 | | 7/1996 |
| JP | 08-504305 | | 7/1996 |
| JP | 08-214076 | | 8/1996 |
| JP | 08-214346 | | 8/1996 |
| JP | 08-510071 | | 10/1996 |
| JP | 8-321885 | | 12/1996 |
| JP | 8-329118 | | 12/1996 |
| JP | 8-331618 | | 12/1996 |
| JP | 09-036963 | | 2/1997 |
| JP | 09-501812 | | 2/1997 |
| JP | 09-504394 | | 4/1997 |
| JP | 09-149137 | | 6/1997 |
| JP | 09-163031 | | 6/1997 |
| JP | 09-224093 | | 8/1997 |
| JP | 09-508508 | | 8/1997 |
| JP | 09-233118 | | 9/1997 |
| JP | 09-265408 | | 10/1997 |
| JP | 10-11374 | | 1/1998 |
| JP | 10-13811 | | 1/1998 |
| JP | 10-51549 | | 2/1998 |
| JP | 10-093713 | | 4/1998 |
| JP | 10-093716 | | 4/1998 |
| JP | 10-504425 | | 4/1998 |
| JP | 10-116249 | | 5/1998 |
| JP | 10-143451 | | 5/1998 |
| JP | 10-506766 | | 6/1998 |
| JP | 10-214113 | | 8/1998 |
| JP | 10-224477 | | 8/1998 |
| JP | 10-509847 | | 9/1998 |
| JP | 10-304073 | | 11/1998 |
| JP | 10-304074 | | 11/1998 |
| JP | 10-327258 | | 12/1998 |
| JP | 10-513632 | | 12/1998 |
| JP | 11055741 | | 2/1999 |
| JP | 11-506292 | | 6/1999 |
| JP | 11-508430 | | 7/1999 |
| JP | 11-508715 | | 7/1999 |
| JP | 11183189 | | 7/1999 |
| JP | 11-317817 | | 11/1999 |
| JP | 11-512906 | | 11/1999 |
| JP | 11-346266 | | 12/1999 |
| JP | 2000-011005 | | 1/2000 |
| JP | 2000-49847 | | 2/2000 |
| JP | 2000-151819 | | 5/2000 |
| JP | 2000-514985 | | 11/2000 |
| JP | 2000-514986 | | 11/2000 |
| JP | 2000-516432 | | 12/2000 |
| JP | 2000-516795 | | 12/2000 |
| JP | 2000-517142 | | 12/2000 |
| JP | 2001-500677 | | 1/2001 |
| JP | 2001-103533 | | 4/2001 |
| JP | 2001-292236 | | 10/2001 |
| JP | 2001-516993 | | 10/2001 |
| JP | 2001-517027 | | 10/2001 |
| JP | 2001-517029 | | 10/2001 |
| JP | 2001-517038 | | 10/2001 |
| JP | 2001-518754 | | 10/2001 |
| JP | 2001-522201 | | 11/2001 |
| JP | 2001-523930 | | 11/2001 |
| JP | 3226929 | B2 | 11/2001 |
| JP | 2001-524782 | | 12/2001 |
| JP | 2001-526871 | | 12/2001 |
| JP | 2002-503903 | | 2/2002 |
| JP | 2002-503921 | | 2/2002 |
| JP | 2002-504783 | | 2/2002 |
| JP | 2002-518890 | | 6/2002 |
| JP | 2002-519762 | | 7/2002 |
| JP | 2002-525895 | | 8/2002 |
| JP | 2002-528824 | | 9/2002 |
| JP | 2002-529836 | | 9/2002 |
| JP | 2002-529943 | | 9/2002 |
| JP | 2002-529944 | | 9/2002 |
| JP | 2002-529945 | | 9/2002 |
| JP | 2002-529994 | | 9/2002 |
| JP | 2002-530010 | | 9/2002 |
| JP | 2002-534003 | | 10/2002 |
| JP | 2002-537594 | | 11/2002 |
| JP | 2003-502720 | | 1/2003 |
| JP | 2003-507908 | | 2/2003 |
| JP | 2003-510929 | | 3/2003 |
| JP | 3384792 | B2 | 3/2003 |
| JP | 3393119 | B2 | 4/2003 |
| JP | 2003-516672 | | 5/2003 |
| JP | 3453561 | B2 | 10/2003 |
| JP | 3461488 | B2 | 10/2003 |
| JP | 3516656 | B2 | 4/2004 |
| JP | 3516659 | B2 | 4/2004 |
| JP | 3547142 | B2 | 7/2004 |
| JP | 3547397 | B2 | 7/2004 |
| JP | 2004-312730 | | 11/2004 |
| JP | 2005-504452 | | 2/2005 |
| JP | 3615708 | B2 | 2/2005 |
| JP | 3628962 | B2 | 3/2005 |
| JP | 2005-094780 | | 4/2005 |
| JP | 2005-102234 | | 4/2005 |
| JP | 2005-124184 | | 5/2005 |
| JP | 3681403 | B2 | 8/2005 |
| JP | 3681406 | B2 | 8/2005 |
| JP | 3686087 | B2 | 8/2005 |
| JP | 3686337 | B2 | 8/2005 |
| JP | 3735124 | B2 | 1/2006 |
| JP | 3820151 | | 9/2006 |
| JP | 2006-295947 | | 10/2006 |
| JP | 3877523 | B2 | 2/2007 |

(56) References Cited

FOREIGN PATENT DOCUMENTS

| | | | |
|---|---|---|---|
| JP | 4057785 | B2 | 3/2008 |
| JP | 4205310 | B2 | 1/2009 |
| JP | 4234926 | B2 | 3/2009 |
| JP | 4295186 | B2 | 7/2009 |
| JP | 4450515 | B2 | 4/2010 |
| JP | 2012-513725 | | 6/2012 |
| KR | 10-2011-0098841 | A | 9/2011 |
| WO | 9208194 | A1 | 5/1992 |
| WO | 9401959 | A1 | 1/1994 |
| WO | 9429995 | A1 | 12/1994 |
| WO | 9508236 | A2 | 3/1995 |
| WO | 9520860 | A1 | 8/1995 |
| WO | 9533325 | A2 | 12/1995 |
| WO | 9614704 | A1 | 5/1996 |
| WO | 9620553 | A2 | 7/1996 |
| WO | 9623265 | A1 | 8/1996 |
| WO | 9627254 | A1 | 9/1996 |
| WO | 9701917 | A1 | 1/1997 |
| WO | 9712472 | A1 | 4/1997 |
| WO | 9713352 | A1 | 4/1997 |
| WO | 9716014 | A2 | 5/1997 |
| WO | 9718662 | A1 | 5/1997 |
| WO | 9720424 | A1 | 6/1997 |
| WO | 9722201 | A2 | 6/1997 |
| WO | 9723078 | A1 | 6/1997 |
| WO | 9726749 | A1 | 7/1997 |
| WO | 9728635 | A1 | 8/1997 |
| WO | 9729584 | A1 | 8/1997 |
| WO | 9734401 | A1 | 9/1997 |
| WO | 9736414 | A1 | 10/1997 |
| WO | 9737500 | A1 | 10/1997 |
| WO | 9738389 | A2 | 10/1997 |
| WO | 9738519 | A1 | 10/1997 |
| WO | 9750235 | A1 | 12/1997 |
| WO | 9801987 | A1 | 1/1998 |
| WO | 9810573 | A2 | 3/1998 |
| WO | 9813765 | A1 | 4/1998 |
| WO | 9813974 | A1 | 4/1998 |
| WO | 9817048 | A1 | 4/1998 |
| WO | 9827479 | A2 | 6/1998 |
| WO | 9831130 | A1 | 7/1998 |
| WO | 9834390 | A1 | 8/1998 |
| WO | 9835326 | A1 | 8/1998 |
| WO | 9835509 | A2 | 8/1998 |
| WO | 9836551 | A1 | 8/1998 |
| WO | 9837481 | A1 | 8/1998 |
| WO | 9837677 | A2 | 8/1998 |
| WO | 9837686 | A1 | 8/1998 |
| WO | 9837687 | A1 | 8/1998 |
| WO | 9844699 | A1 | 10/1998 |
| WO | 9844714 | A1 | 10/1998 |
| WO | 9848577 | A2 | 10/1998 |
| WO | 9854877 | A2 | 12/1998 |
| WO | 9856133 | A2 | 12/1998 |
| WO | 9856141 | A1 | 12/1998 |
| WO | 9857501 | A2 | 12/1998 |
| WO | 9900960 | A1 | 1/1999 |
| WO | 9900966 | A1 | 1/1999 |
| WO | 9903247 | A2 | 1/1999 |
| WO | 9912367 | A1 | 3/1999 |
| WO | 9913635 | A1 | 3/1999 |
| WO | 9914919 | A1 | 3/1999 |
| WO | 9914920 | A1 | 3/1999 |
| WO | 9914924 | A1 | 3/1999 |
| WO | 9914951 | A1 | 3/1999 |
| WO | 9917518 | A1 | 4/1999 |
| WO | 9923806 | A1 | 5/1999 |
| WO | 9923807 | A1 | 5/1999 |
| WO | 9926395 | A1 | 5/1999 |
| WO | 9926424 | A2 | 5/1999 |
| WO | 9927698 | A1 | 6/1999 |
| WO | 9941720 | A1 | 8/1999 |
| WO | 9941890 | A2 | 8/1999 |
| WO | 9941891 | A1 | 8/1999 |
| WO | 9941895 | A1 | 8/1999 |
| WO | 9943137 | A1 | 8/1999 |
| WO | 9925117 | | 10/1999 |
| WO | 9956227 | A1 | 11/1999 |
| WO | 9956229 | A1 | 11/1999 |
| WO | 9965214 | A1 | 12/1999 |
| WO | 9965252 | A2 | 12/1999 |
| WO | 9967718 | A1 | 12/1999 |
| WO | 0007332 | A2 | 2/2000 |
| WO | 0016203 | A1 | 3/2000 |
| WO | 0016207 | A1 | 3/2000 |
| WO | 0016523 | A1 | 3/2000 |
| WO | 0018094 | A1 | 3/2000 |
| WO | 0025238 | A1 | 5/2000 |
| WO | 0026804 | A1 | 5/2000 |
| WO | 0026816 | A1 | 5/2000 |
| WO | 0026817 | A1 | 5/2000 |
| WO | 0027063 | A2 | 5/2000 |
| WO | 0028425 | A1 | 5/2000 |
| WO | 0028702 | A1 | 5/2000 |
| WO | 0035173 | A1 | 6/2000 |
| WO | 0038398 | A1 | 6/2000 |
| WO | 0044159 | A1 | 7/2000 |
| WO | 0049482 | A2 | 8/2000 |
| WO | 0049778 | A1 | 8/2000 |
| WO | 0113606 | A1 | 2/2001 |
| WO | 0124025 | A1 | 4/2001 |
| WO | 0140997 | A1 | 6/2001 |
| WO | 0141372 | A1 | 6/2001 |
| WO | 0143410 | A1 | 6/2001 |
| WO | 0152513 | A1 | 7/2001 |
| WO | 0180214 | A1 | 10/2001 |
| WO | 0180540 | A1 | 10/2001 |
| WO | 0184360 | A1 | 11/2001 |
| WO | 02065741 | A2 | 8/2002 |
| WO | 03010948 | A1 | 2/2003 |
| WO | 2004063854 | A2 | 7/2004 |
| WO | 2005036907 | A1 | 4/2005 |
| WO | 2006055059 | A2 | 5/2006 |
| WO | 2010075151 | A1 | 7/2010 |

OTHER PUBLICATIONS

"Guide for the Use of Micro-Researcher II/SGR (Scroll Graph Section)," NEC Corporation, Third Edition, Chapters 1 & 5, Jul. 1995, 2 pages.

"Kana: Customer Messaging System," Kana Communications Sales Brochure, Palo Alto, CA, 1996, 12 pages.

"Latest Trend in CTI," Nikkei Communications, No. 248, Jun. 16, 1997, 14 pages.

"Method for Automatic Contextual Transposition Upon Receipt of Item of Specified Criteria," IBM Technical Disclosure Bulletin, vol. 37, No. 2B, Feb. 1994, 1 page.

"New Telephone Service Changing Computer Telephone Business," Nikkei Communications, Nov. 11, 1996, 7 pages.

"Single Line Suffices for Internet Telephone," Nikkei Communications, May 19, 1997, 9 pages.

Bachmann, David W. et al., "NetMod: A Design Tool for Large-Scale Heterogeneous Campus Networks," Center for Information Technology Integration (CITI), the University of Michigan, Ann Arbor, MI, Jun. 15, 1990, 34 pages.

Bangun, H. et al., A Network Architecture for Multiuser Networked Games on Demand, International Conference on Information Communications and Signal Processing, ICICS '97, Sep. 9-12, 1997, 5 pages.

Bertsekas, Dimitri et al., "Data Networks," Prentice-Hall, New Jersey, 1987, 5 pages.

Chau, Sam et al., "Intelligent Network Routing Using CCS7 and ISDN," Global Telecommunications Conference, vol. 3, 6 pages, 1990.

Chaudhuri, Surajit et al., "Optimizing Queries over Multimedia Repositories," Hewlett-Packard Laboratories, Stanford, Mar. 1996, 12 pages.

Chaum, David, "Untraceable Electronic Mail, Return Addresses, and Digital Pseudonyms," Communications of the ACM, vol. 24, No. 2, Feb. 1981, 8 pages.

(56) References Cited

OTHER PUBLICATIONS

Chew, T.-S. et al., "Netplan-a Telecommunications Network Planning Support System," TENCON '92, IEEE Region 10 International Conference, vol. 2, 7 pages, 1992.
Chiu, H. et al., "Conferencing Metaphor," IBM Technical Disclosure Bulletin, vol. 36, No. 2, Feb. 1993, 4 pages.
Cordom, Christopher et al., "Conversant VIS Listens and Talks to Your Customers," AT&T Technology, vol. 9, No. 2, 4 pages, 1994.
D'Hooge, Herman, "The Communicating PC," IEEE Communications Magazine, 6 pages, Apr. 1996.
Durinovic-Johri, Sanja et al., "Advanced Routing Solutions for Toll-Free Customers: Algorithm Design and Performance," Proceedings of the International Teletraffic Congress, ITC-15, 1997, 12 pages.
Esesve, D.R., "Wireless Application Protocol (WAP)," Vitam College of Engineering, No Date Available, 12 pages.
Festa, Paul, "Vignette Updates StoryServer Platform," CNET News.com, Sep. 16, 1997, 4 pages.
Foster, Robin Harris, "Advanced Definity Call Centers: Working for You and Your Customers," AT&T Technology, vol. 9, No. 2, 1994, 6 pages.
Francis, Paul et al., "Flexible Routing and Addressing for a Next Generation IP," SIGCOMM, 10 pages, 1994.
Gawrys, G.W., et al., "ISDN: Integrated Network/Premises Solutions for Customer Needs," ICC, 6 pages, 1986.
Gechter, J. et al., "ISDN Service Opportunities in the Intelligent Network," Proceedings of the National Communications Forum, Chicago, IL, vol. 43, No. 1, Oct. 1989, 4 pages.
Harvey, Dean E. et al., "Call Center Solutions," AT&T Technical Journal, vol. 70, No. 5, 10 pages, Sep./ Oct. 1991.
Held, Gilbert, "Voice Over Data Networks," McGraw Hill, Texas, 1998, 16 pages.
Henderson, Shane G. et al., "Rostering by Interating Integer Programming and Simulation," Proceedings of the 1998 Winter Simulation Conference, Washington D.C., Dec. 13, 1998, 7 pages.
Hofmann, Peter. et al., "@INGate: Integrating Telephony and Internet," IEEE Conference on Protocols for Multimedia Systems, 4 pages, Nov. 1997.
House, Eric, "How to Munge Outgoing From: Field When Using Mail?," Google Discussion Group, Apr. 2, 1997, 1 page.
Hu, Michael Junke et al., "An Object-Relational Database System for the Interactive Multimedia," IEEE International Conference on Intelligent Processing Systems, pp. 1571-1575, Oct. 1997.
International Search Report for PCT/US96/16919, dated Jun. 2, 1997, 3 pages.
International Search Report for PCT/US97/01469, dated Apr. 14, 1997, 1 page.
International Search Report for PCT/US97/05457, dated Jun. 24, 1997, 2 pages.
International Search Report for PCT/US97/11881, dated Oct. 24, 1997, 1 page.
Kaufman, Harvey, "Call Centers in Cyberspace," Communications News, vol. 34, Issue 7, Jul. 1997, 4 pages.
Kramer, Brian, "How to Send a File to the Sender of a Message?," Google Discussion Group, May 27, 1994, 5 pages.
Lee, Chien-I, et al., "A New Storage and Retrieval Method to Support Editing Operations in a Multi-Disk-based Video Server," Fourth International Conference on Parallel and Distributed Information Systems, IEEE, Miami Beach, FL, Dec. 1996, 10 pages.
Lin, Yi-Bing et al., "A Flexible Graphical User Interface for Performance Modeling," Software—Practice and Experience, vol. 25(2), Feb. 1995, 24 pages.
Low, Colin, "The Internet Telephony Red Herring," Global Telecommunications Conference, Nov. 1996, 15 pages.
Mackay, Wendy E., et al., "Virtual Video Editing in Interactive Multimedia Applications," Communications of the ACM, vol. 32, No. 7, Jul. 1989, 9 pages.
Masashi, Tsuboi et al., "Computer Telephony Integration System," CTSTAGE, Oki Electric Research and Development, 174, vol. 64, No. 2, Apr. 1, 1997, 10 pages.
Matsuo, Yasunori, "Microsoft Project for Windows 95," Nikkei Personal Computing, Nikkei Business Publications, Inc., No. 255, Dec. 18, 1995, 2 pages.
Mattison, Rob, "Data Warehousing and Data Mining for Telecommunications," Artech House, Boston, 1997, 7 pages.
Metz, Christopher, "IP Routers: New Tool for Gigabit Networking," On the Wire, IEEE Internet, Nov./Dec. 1998, 5 pages.
Microsoft Dictionary Pages, Microsoft Press, Redmond, WA, 1991, 2 pages.
Orozco-Barbosa, Luis et al., "Design and Performance Evaluation of Intelligent Multimedia Services," Computer Communications, vol. 20, 1997, 14 pages.
Padmanabhan, M., et al. Speech Recognition Performance on a Voicemail Transcription Task, IBM T.J. Watson Research Center, Yorktown Height, NY, 4 pages.
Rangan, P. Venkat, et al., "A Window-Based Editor for Digital Video and Audio," Proceedings of the 25th Hawaii International Conference on System Sciences, IEEE, vol. 2, Jan. 1992, 9 pages.
Recker, Mimi M. et al., "Predicting Document Access in Large, Multimedia Repositories," ACM Transactions on Computer-Human Interaction, vol. 3, 1994, 23 pages.
Schmandt, Chris, "Phoneshell: The Telephone as Computer Terminal," Proceedings of ACM Multimedia Conference, 1993, 10 pages.
Semilof, Margie, "Call Centers Go On-Line," Communications Week, No Date Available, 2 pages.
Smith, J.D., An Overview to Computer-Telecommunications Integration (CTI), Telecommunications, Conference Publication No. 404, IEEE, Mar. 26-29, 1995, 5 pages.
Sulkin, Allan, Building the ACD-LAN Connection, Business Communications Review, Jun. 1996, 4 pages.
Szlam, Aleksander et al., "Predictive Dialing Fundamentals," Flatiron Publishing, New York, 1996, 28 pages.
Toji, Ryutaro et al., "A Study of Customer Contact Operation System and Functions," Proceedings of the IECE General Conference, Comm. 2, Mar. 6, 1997, 3 pages.
Tsunemasa, Mizuo., "CTI World 2: World of CTI," Business Communication, vol. 34, No. 2, Feb. 1, 1997, 13 pages.
Van Zijl, Lynette, et al., "A Tool for Graphical Network Modeling and Analysis," IEEE Software, Jan. 1992, 8 pages.
Vazquez, E., et al., Graphical Interface for Communication Network Analysis and Simulation, Department of Telematic Engineering, Technical University of Madrid, IEE, 1991, Spain, 4 pages.
Zenel, Bruce et al., Intelligent Communication Filtering for Limited Bandwidth Environments, Computer Science Department, Columnia University, IEEE, 1995, 7 pages.
"Solution Drivers/CTI, CTI Solution Strategy of Seven Computer Vendors, Toward Market Development of Mainly Bank, Insurance and Communications Markets," Computopia, Computer Age Co., Ltd., Japan, vol. 33, No. 379, 5 pages, Apr. 1998.
Beck, C. et al., Interactive process of operating system for multimedia communication center, Genesys Telecom Lab, Inc. 2014, 3 pages.
Bernett, Howard et al., "Assessing Web-Enabled Call Center Technologies," IT Pro, May/Jun. 2001, 7 pages.
Bickley, M. et al., Using Servers to Enhance Control System Capability, 1999 Particle Accelerator Conference, New York, NY, Mar. 29-Apr. 2, 1999, 3 pages.
Bradley, Kirk A. et al., "Detecting Disruptive Routers: A Distributed Network Monitoring Approach," Department of Computer Science, University of California, Davis, Sep. 1, 1998, 10 pages.
Canadian Office Action for Application No. 2,259,912, dated Nov. 19, 2001, 2 pages.
Canadian Office Action for Application No. 2,289,198, dated Jun. 28, 2002, 2 pages.
Canadian Office Action for Application No. 2,302,397, dated Apr. 23, 2002, 2 pages.
Canadian Office Action for Application No. 2,302,678, dated Apr. 23, 2002, 2 pages.
Canadian Office Action for Application No. 2308590, dated Jun. 28, 2002, 2 pages.
Canadian Office Action for Application No. 2309183, dated Jul. 23, 2002, 2 pages.

(56) References Cited

OTHER PUBLICATIONS

Canadian Office Action for Application No. 2320978, dated Jun. 2, 2003, 2 pages.
Canadian Office Action for Application No. 2320978, dated Sep. 26, 2002, 2 pages.
Canadian Office Action for Application No. 2334513, dated May 30, 2003, 2 pages.
Canadian Office Action for Application No. 2347721, dated Aug. 12, 2004, 3 pages.
Canadian Office Action for Application No. 2352973, dated Apr. 17, 2003, 3 pages.
Chan, Kevin F. et al., "Interactive Network Planning and Analysis on a Personal Computer," Computer Applications in Power, IEEE, vol. 3, No. 1, Jan. 1990, 5 pages.
Chinese Office Action for Application No. 200980151937.6, dated Jul. 1, 2013, 14 pages.
Chinese Office Action for Application No. 98812258.8 dated Jul. 26, 2002, 5 pages.
Chinese Office Action for Application No. 98812259.6, dated Jan. 10, 2003, 9 pages.
Chinese Office Action for Application No. 98812261.8, dated Jun. 20, 2003, 10 pages.
Chinese Office Action for Application No. 99808531.6, dated Mar. 14, 2003, 14 pages.
Chinese Office Action for Application No. 99811995.4, dated Apr. 8, 2005, 6 pages.
Chinese Office Action for Application No. 99811995.4, dated Jul. 6, 2007, 11 pages.
Chinese Office Action for Application No. 99811996.2, dated May 9, 2003, 10 pages.
Chinese Office action for Patent Application No. 200980151937.6, dated Feb. 15, 2015, 6 pages.
Chinese Office action with English Translation for Application No. 200980151937.6 dated May 23, 2014, 7 pages.
Chou, Sheng-Lin., et al., "Computer Telephony Integration and Its Applications," IEEE Communications Surveys & Tutorials, vol. 3, No. 1, 2000, 10 pages.
Curbera, Francisco et al., "Unraveling the Web Services Web: An Introduction to SOAP, WSDL, and UDDI," IEEE Internet Computing, 8 pages, Mar./Apr. 2002.
Eren, P. Erhan, et al., "Interactive Object-Based Analysis and Manipulation of Digital Video," IEEE Workshop on Multimedia Signal Processing, 1998, 6 pages.
European Office action Application No. 04011886.1, dated Mar. 9, 2007, 6 pages.
European Office action for Application No. 00115441.8, dated Feb. 11, 2004, 7 pages.
European Office action for Application No. 00115441.8, dated Mar. 15, 2005, 4 pages.
European Office Action for Application No. 00115441.8, dated May 18, 2006, 11 pages.
European Office Action for Application No. 00119160.0, dated Jan. 16, 2004, 6 pages.
European Office action for Application No. 00123329.5, dated Jun. 17, 2002, 6 pages.
European Office Action for Application No. 00123331.1, dated Apr. 18, 2006, 5 pages.
European Office Action for Application No. 00305049.9, dated Dec. 29, 2003, 5 pages.
European Office Action for Application No. 00908266.0, dated Aug. 10, 2005, 6 pages.
European Office action for Application No. 02400027.5, dated Jan. 21, 2008, 5 pages.
European Office action for Application No. 02756535.7, dated Aug. 5, 2005, 6 pages.
European Office Action for Application No. 03022831.6, dated Nov. 30, 2006, 7 pages.
European Office Action for Application No. 03800376.0, dated Jul. 8, 2008, 6 pages.
European Office Action for Application No. 04009176.1, dated Oct. 12, 2011, 8 pages.
European Office Action for Application No. 97904087.0, dated Jun. 25, 2002, 5 pages.
European Office Action for Application No. 97933327.5, dated Aug. 26, 2002, 4 pages.
European Office Action for Application No. 97933327.5, dated Feb. 7, 2002, 5 pages.
European Office Action for Application No. 98903471.5, dated May 29, 2006, 4 pages.
European Office Action for Application No. 98903471.5, dated Oct. 11, 2004, 6 pages.
European Office Action for Application No. 98908545.1, dated Mar. 15, 2005, 4 pages.
European Office Action for Application No. 98908545.1, dated Nov. 14, 2003, 10 pages.
European Office Action for Application No. 98924821.6, dated Aug. 26, 2003, 4 pages.
European Office Action for Application No. 98926248.0, dated Aug. 5, 2004, 4 pages.
European Office Action for Application No. 98926248.0, dated Dec. 11, 2003, 4 pages.
European Office Action for Application No. 98926248.0, dated Oct. 21, 2002, 6 pages.
European Office Action for Application No. 98944799.0, dated Aug. 18, 2005, 7 pages.
European Office Action for Application No. 98944799.0, dated Mar. 26, 2008, 5 pages.
European Office Action for Application No. 98944830.3, dated Jan. 30, 2006, 9 pages.
European Office Action for Application No. 98946907.7, dated Jun. 1, 2006, 6 pages.
European Office Action for Application No. 98946926.7, dated Dec. 8, 2005, 4 pages.
European Office Action for Application No. 98953947.3, dated Aug. 22, 2006, 6 pages.
European Office Action for Application No. 98953962.2, dated Oct. 28, 2005, 5 pages.
European Office Action for Application No. 98956309.3, dated Jun. 8, 2005, 5 pages.
European Office Action for Application No. 99905907.4, dated Oct. 31, 2005, 4 pages.
European Office Action for Application No. 99906856.2, dated Sep. 24, 2007, 5 pages.
European Office Action for Application No. 99906958.6, dated Feb. 22, 2006, 7 pages.
European Office Action for Application No. 99927333.7, dated Aug. 21, 2006, 9 pages.
European Office Action for Application No. 99927340.2, dated Aug. 9, 2011, 6 pages.
European Office Action for Application No. 99927340.2, dated Nov. 25, 2013, 5 pages.
European Office Action for Application No. 99945479.6, dated Aug. 9, 2006, 6 pages.
European Office Action for Application No. 99945519.9, dated Aug. 20, 2007, 6 pages.
European Office action for Application No. 99956732.4, dated Aug. 17, 2006, 7 pages.
European Office action for Application No. 99956745.6, dated Mar. 14, 2006, 5 pages.
European Office Action for Application No. 99960267.5, dated May 10, 2007, 6 pages.
European Office Action for Application No. 99960279.0, dated Aug. 16, 2005, 6 pages.
European Office Action for Application No. 99965163.1, dated Jul. 13, 2009, 5 pages.
European Search Report and Written Opinion for Application No. 05783002.8, dated Mar. 16, 2009, 8 pages.
European Search Report for 0115441.8 (now EP1075153), dated Nov. 6, 2002, 3 pages.
European Search Report for Application No. 00123329.5, dated Jan. 30, 2002, 2 pages.

(56) References Cited

OTHER PUBLICATIONS

European Search Report for Application No. 00123331.1, dated Dec. 5, 2003, 6 pages.
European Search Report for Application No. 00305049.9, dated May 7, 2003, 3 pages.
European Search Report for Application No. 00908266.0, dated May 24, 2005, 3 pages.
European Search Report for Application No. 00913226.7, dated Feb. 14, 2005, 3 pages.
European Search Report for Application No. 0119160.0, dated Apr. 17, 2003, 3 pages.
European Search Report for Application No. 01920248.0, dated May 3, 2004, 3 pages.
European Search Report for Application No. 01927387.9, dated Jun. 2, 2006, 3 pages.
European Search Report for Application No. 02400027.5, dated Feb. 20, 2004, 3 pages.
European Search Report for Application No. 02756535.7, dated May 25, 2005, 4 pages.
European Search Report for Application No. 03002575.3, dated Jun. 4, 2003, 3 pages.
European Search Report for Application No. 03008532.8, dated Dec. 27, 2004, 3 pages.
European Search Report for Application No. 03008534.4, dated Jul. 23, 2003, 3 pages.
European Search Report for Application No. 03022831.6, dated Mar. 22, 2006, 3 pages.
European Search Report for Application No. 03023463.7, dated Jun. 14, 2004, 3 pages.
European Search Report for Application No. 03076826.1, dated Sep. 10, 2003, 3 pages.
European Search Report for Application No. 03077174.5, dated Sep. 4, 2003, 4 pages.
European Search Report for Application No. 03077712.2, dated Mar. 29, 2004, 3 pages.
European Search Report for Application No. 03800376, dated May 7, 2007, 3 pages.
European Search Report for Application No. 04007911.3, dated Aug. 17, 2004, 5 pages.
European Search Report for Application No. 04007913.9, dated Aug. 5, 2004, 4 pages.
European Search Report for Application No. 04011886.1, dated Jun. 22, 2006, 5 pages.
European Search Report for Application No. 07018035.1, dated Apr. 23, 2009, 4 pages.
European Search Report for Application No. 97904087.0, dated Nov. 5, 2001, 3 pages.
European Search Report for Application No. 97933327.5, dated Oct. 11, 2001, 3 pages.
European Search Report for Application No. 98903471.5, dated Jul. 26, 2002, 4 pages.
European Search Report for Application No. 98903623.1, dated Apr. 17, 2002, 3 pages.
European Search Report for Application No. 98907371.3, dated Mar. 28, 2002, 3 pages.
European Search Report for Application No. 98924821.6, dated Jun. 13, 2002, 2 pages.
European Search Report for Application No. 98926248, dated Jul. 18, 2002, 3 pages.
European Search Report for Application No. 98944799.0, dated Aug. 5, 2004, 3 pages.
European Search Report for Application No. 98944830.3, dated Aug. 11, 2004, 3 pages.
European Search Report for Application No. 98946907.7, dated Aug. 11, 2004, 3 pages.
European Search Report for Application No. 98946926.7, dated Aug. 11, 2004, 3 pages.
European Search Report for Application No. 98948163.5, dated Aug. 8, 2000, 3 pages.
European Search Report for Application No. 98948164.3, dated Jun. 15, 2004, 3 pages.
European Search Report for Application No. 98953947.3, dated Aug. 20, 2004, 3 pages.
European Search Report for Application No. 98953962.2, dated Sep. 2, 2004, 3 pages.
European Search Report for Application No. 98956187.3, dated Sep. 16, 2005, 3 pages.
European Search Report for Application No. 98956309.3, dated Sep. 10, 2004, 3 pages.
European Search Report for Application No. 99905907.4, dated Jun. 1, 2005, 3 pages.
European Search Report for Application No. 99906856.2, dated Oct. 4, 2006, 3 pages.
European Search Report for Application No. 99906958.6, dated Aug. 19, 2005, 3 pages.
European Search Report for Application No. 99927333.7, dated Mar. 30, 2005, 5 pages.
European Search Report for Application No. 99927340.2, dated Oct. 18, 2004, 3 pages.
European Search Report for Application No. 99945479.6, dated Mar. 24, 2006, 3 pages.
European Search Report for Application No. 99945519.9, dated Oct. 18, 2005, 3 pages.
European Search Report for Application No. 99945556.1, dated Nov. 16, 2004, 3 pages.
European Search Report for Application No. 99956732.4, dated Apr. 19, 2006, 4 pages.
European Search Report for Application No. 99956745.6, dated Jun. 30, 2005, 3 pages.
European Search Report for Application No. 99960267.5, dated Jul. 14, 2005, 3 pages.
European Search Report for Application No. 99960279.0, dated Apr. 26, 2005, 3 pages.
European Search Report for Application No. 99965163.1, dated Nov. 19, 2004, 4 pages.
European Search Report for Application No. 99971602.0, dated Feb. 6, 2007, 3 pages.
International Preliminary Examination Report for PCT/US01/13313, dated Apr. 22, 2002, 4 pages.
International Preliminary Examination Report for PCT/US01/40267, dated Dec. 9, 2002, 4 pages.
International Preliminary Examination Report for PCT/US96/16919, dated Feb. 18, 1998, 18 pages.
International Preliminary Examination Report for PCT/US97/01469, dated Oct. 14, 1998, 8 pages.
International Preliminary Examination Report for PCT/US97/11881, dated Mar. 27, 1998, 3 pages.
International Preliminary Examination Report for PCT/US98/00631, dated Sep. 10, 1999, 7 pages.
International Preliminary Examination Report for PCT/US98/02847, dated Jul. 9, 1999, 5 pages.
International Preliminary Examination Report for PCT/US98/13644, dated Jan. 12, 2000, 6 pages.
International Preliminary Examination Report for PCT/US98/18646, dated Oct. 30, 2000, 5 pages.
International Preliminary Examination Report for PCT/US98/18789, dated Dec. 30, 1999, 6 pages.
International Preliminary Examination Report for PCT/US98/22527, dated Jun. 30, 2000, 5 pages.
International Preliminary Examination Report for PCT/US99/12841, dated Jan. 22, 2001, 5 pages.
International Preliminary Examination Report for PCT/US99/25308, dated Sep. 10, 2000, 3 pages.
International Preliminary Examination Report for PCT/US99/25309, dated May 8, 2001, 4 pages.
International Preliminary Report on Patentability for PCT/US2005/027544, dated May 22, 2007, 7 pages.
International Search Report and Written Opinion for PCT/US2009/068402, dated Mar. 31, 2010, 10 pages.
International Search Report for PCT/US00/00781, dated Apr. 12, 2000, 2 pages.

(56) References Cited

OTHER PUBLICATIONS

International Search Report for PCT/US00/00785, dated Oct. 2, 2000, 2 pages.
International Search Report for PCT/US00/023066, dated Oct. 30, 2000, 1 page.
International Search Report for PCT/US00/27982, dated Jan. 31, 2001, 3 pages.
International Search Report for PCT/US00/27983, dated Mar. 19, 2001, 2 pages.
International Search Report for PCT/US00/27984, dated Mar. 22, 2001, 1 page.
International Search Report for PCT/US01/07457, dated Aug. 30, 2001, 1 page.
International Search Report for PCT/US01/13313, dated Jul. 6, 2001, 1 page.
International Search Report for PCT/US01/40267, dated Jul. 17, 2001, 1 page.
International Search Report for PCT/US02/23080, dated Oct. 1, 2002, 1 page.
International Search Report for PCT/US03/41677, dated Apr. 10, 2006, 1 page.
International Search Report for PCT/US05/27544, dated Jun. 14, 2006, 1 page.
International Search Report for PCT/US98/00631, dated Jun. 18, 1998, 1 page.
International Search Report for PCT/US98/01158, dated Jul. 17, 1998, 1 page.
International Search Report for PCT/US98/02152, dated Jun. 25, 1998, 1 page.
International Search Report for PCT/US98/02847, dated Aug. 6, 1998, 1 page.
International Search Report for PCT/US98/02848, dated Aug. 11, 1998, 1 page.
International Search Report for PCT/US98/02923, dated Aug. 19, 1998, 1 page.
International Search Report for PCT/US98/06334, dated Sep. 1, 1998, 2 pages.
International Search Report for PCT/US98/10357, dated Jan. 14, 1999, 1 page.
International Search Report for PCT/US98/11442, dated Oct. 21, 1998, 2 pages.
International Search Report for PCT/US98/13644, dated Apr. 21, 1999, 2 pages.
International Search Report for PCT/US98/18646, dated Jan. 29, 1999, 2 pages.
International Search Report for PCT/US98/18789, dated Jan. 29, 1999, 3 pages.
International Search Report for PCT/US98/18833, dated Nov. 19, 1998, 1 page.
International Search Report for PCT/US98/18874, dated Jan. 29, 1999, 1 page.
International Search Report for PCT/US98/18989, dated Jan. 25, 1999, 1 page.
International Search Report for PCT/US98/22527, dated Apr. 2, 1999, 2 pages.
International Search Report for PCT/US98/22555, mailed Mar. 3, 1999, 1 page.
International Search Report for PCT/US98/22600, mailed Jun. 4, 1999, 1 page.
International Search Report for PCT/US98/22935, mailed Apr. 14, 1999, 1 page.
International Search Report for PCT/US99/02812, mailed May 11, 1999, 1 page.
International Search Report for PCT/US99/02814, mailed Jun. 17, 1999, 1 page.
International Search Report for PCT/US99/02822, mailed Aug. 18, 1999, 1 page.
International Search Report for PCT/US99/03038, mailed Apr. 23, 1999, 1 page.
International Search Report for PCT/US99/03039, mailed May 11, 1999, 1 page.
International Search Report for PCT/US99/12700, dated Nov. 30, 1999, 1 page.
International Search Report for PCT/US99/12781, dated Sep. 9, 1999, 2 pages.
International Search Report for PCT/US99/12841, dated Sep. 10, 1999, 2 pages.
International Search Report for PCT/US99/20259, dated Feb. 15, 2000, 1 page.
International Search Report for PCT/US99/20387, dated Dec. 7, 1999, 2 pages.
International Search Report for PCT/US99/20461, dated Dec. 23, 1999, 2 pages.
International Search Report for PCT/US99/25117, dated Nov. 1, 2000, 2 pages.
International Search Report for PCT/US99/25265, dated Feb. 18, 2000, 1 page.
International Search Report for PCT/US99/25308, dated Feb. 3, 2000, 1 page.
International Search Report for PCT/US99/25309, dated Feb. 10, 2000, 1 page.
International Search Report for PCT/US99/25310, dated Feb. 10, 2000, 1 page.
International Search Report for PCT/US99/26619, dated Mar. 17, 2000, 1 page.
International Search Report for PCT/US99/26659, dated Feb. 4, 2000, 1 page.
International Search Report for PCT/US99/29043, dated Mar. 20, 2000, 1 page.
International Search Report for PCT/US99/29044, dated May 11, 2000, 1 page.
International Written Opinion for PCT/US98/22527, dated Dec. 27, 1999, 5 pages.
Japanese Interrogation and Re-Examination Report for Application No. 1999-502827, dated Oct. 26, 2004, 7 pages.
Japanese Office Action for Application No. 1997-527811, dated Oct. 10, 2000, 6 pages.
Japanese Office Action for Application No. 1998-505335, dated Mar. 5, 2002, 7 pages.
Japanese Office Action for Application No. 1998-531244, dated Jan. 6, 2004, 4 pages.
Japanese Office Action for Application No. 1998-531244, dated Sep. 10, 2002, 5 pages.
Japanese Office Action for Application No. 1998-536740, dated Feb. 24, 2004, 5 pages.
Japanese Office Action for Application No. 1998-536740, dated Sep. 3, 2002, 14 pages.
Japanese Office Action for Application No. 1999-500765, dated Feb. 10, 2004, 6 pages.
Japanese Office Action for Application No. 1999-500765, dated Sep. 3, 2002, 11 pages.
Japanese Office Action for Application No. 1999-502827, dated Dec. 3, 2002, 4 pages.
Japanese Office Action for Application No. 1999-502827, dated May 28, 2002, 3 pages.
Japanese Office Action for Application No. 1999-502827, dated Nov. 1, 2005, 8 pages.
Japanese Office action for Application No. 2000-220082, dated Apr. 1, 2003, 3 pages.
Japanese Office Action for Application No. 2000-511299, dated Feb. 3, 2004, 4 pages.
Japanese Office Action for Application No. 2000-511299, dated May 16, 2006, 7 pages.
Japanese Office Action for Application No. 2000-512333, dated Sep. 3, 2002, 6 pages.
Japanese Office Action for Application No. 2000-512334, dated Sep. 10, 2002, 9 pages.
Japanese Office Action for Application No. 2000-512336, dated Jul. 23, 2002, 8 pages.
Japanese Office Action for Application No. 2000-512336, dated Jun. 24, 2003, 4 pages.

(56) References Cited

OTHER PUBLICATIONS

Japanese Office Action for Application No. 2000-514448, dated Sep. 3, 2002, 10 pages.
Japanese Office Action for Application No. 2000-519541, dated May 16, 2005, 4 pages.
Japanese Office Action for Application No. 2000-519541, dated Aug. 20, 2002, 10 pages.
Japanese Office Action for Application No. 2000-519541, dated Dec. 2, 2003, 7 pages.
Japanese Office Action for Application No. 2000-519541, dated Mar. 14, 2006, 6 pages.
Japanese Office Action for Application No. 2000-522718, dated Sep. 10, 2002, 9 pages.
Japanese Office Action for Application No. 2000-531822, dated Sep. 24, 2002, 6 pages.
Japanese Office Action for Application No. 2000-531940, dated Dec. 3, 2002, 4 pages.
Japanese Office Action for Application No. 2000-532958, dated Aug. 20, 2002, 7 pages.
Japanese Office Action for Application No. 2000-554115, dated Apr. 27, 2005, 5 pages.
Japanese Office Action for Application No. 2000-554115, dated Jan. 6, 2004, 4 pages.
Japanese Office Action for Application No. 2000-554115, dated Oct. 1, 2002, 5 pages.
Japanese Office Action for Application No. 2000-556311, dated Oct. 21, 2003, 6 pages.
Japanese Office Action for Application No. 2000-570673, dated Oct. 4, 2005, 4 pages.
Japanese Office Action for Application No. 2000-570673, dated Mar. 8, 2005, 6 pages.
Japanese Office Action for Application No. 2000-570673, dated Oct. 14, 2003, 6 pages.
Japanese Office Action for Application No. 2000-570677, dated May 11, 2004, 8 pages.
Japanese Office Action for Application No. 2000-570677, dated Nov. 30, 2004, 10 pages.
Japanese Office Action for Application No. 2000-570941, dated Oct. 7, 2003, 6 pages.
Japanese Office Action for Application. No. 2000-578753, dated May 11, 2004, 11 pages.
Japanese Office Action for Application No. 2000-580124, dated Apr. 12, 2005, 6 pages.
Japanese Office Action for Application No. 2000-580124, dated Oct. 7, 2003, 5 pages.
Japanese Office Action for Application No. 2000-580329, dated Feb. 15, 2005, 8 pages.
Japanese Office Action for Application No. 2000-580329, dated May 13, 2008, 8 pages.
Japanese Office Action for Application No. 2000-580329, dated Oct. 4, 2005, 5 pages.
Japanese Office Action for Application No. 2000-581781, dated Feb. 3, 2004, 4 pages.
Japanese Office Action for Application No. 2000-581781, dated Oct. 8, 2002, 4 pages.
Japanese Office Action for Application No. 2000-590363, dated Apr. 1, 2003, 6 pages.
Japanese Office Action for Application No. 2001-526724, dated Aug. 1, 2006, 5 pages.
Japanese Office Action for Application No. 2001-526724, dated Dec. 13, 2005, 5 pages.
Japanese Office Action for Application No. 2001-526724, dated May 17, 2005, 4 pages.
Japanese Office Action for Application No. 2006-127262, dated Jun. 1, 2010 (5 pages).
Japanese Office Action for Application No. 2006-127262, dated Nov. 18, 2008 (7 pages).
Japanese Office Action for Application No. 2011-543586, dated Jan. 24, 2013, 5 pages.
Japanese Office Action for Application No. 532950, dated Dec. 17, 2002, 6 pages.
Katz, Michael, "When CTI Meets the Internet," Telecommunications, vol. 31, No. 7, Jul. 1997, 6 pages.
Kaukonen, S., et al., "Agent-Based Conferencing Using Mobile IP-Telephony," Proceedings of Multimedia Signal Processing, 1999, 6 pages.
Korean Office Action for Application No. 10-2011-7016735, dated Jun. 13, 2013, 3 pages.
Korean Office Action for Application No. 10-2011-7017067, dated Aug. 21, 2012, 9 pages.
Malabocchia, Fabio, et al., "Mining Telecommunications Data Bases: An Approach to Support the Business Management," Network Operations and Management Symposium, IEEE, vol. 1, Feb. 1998, 9 pages.
Matsumoto, Akihiko, "Bank CTI/Call Center Using Up Customer Information, Analysis of Six Major Manufacturers' Solutions," Network Computing, Ric Telecom Corporation, Japan, vol. 10, No. 10, Oct. 1, 1998, 13 pages.
Monson-Haefel, Richard, "Enterprise JavaBeans," O'Reilly & Assoc., 2nd Ed., 1999, 7 pages.
Murayama, Hideki, "Integrated Customer Supporting System View Workshop/CS, OA Business Personal Computer," NEC Business System, Denpa Press Co., Ltd., vol. 15, No. 12, Dec. 1997, 6 pages.
Nariani, Sushil, "Internet Telephony," Whatis.com, Oct. 25, 1999, 2 pages.
Newton's Telecom Dictionary, The Official Dictionary of Telcommunications & the Internet, 16th Edition, Telecom Books, Feb. 2000, 3 pages.
Newton, Harry, "Newton's Telecom Dictionary," Flatiron Publishing, New York, 1994, 7 pages.
Rodriguez-Martinez, Manuel et al., "Mocha: A Self-Extensible Database Middleware System for Distributed Data Sources," International Conference on Management Data—SIGMOD, 2000, 12 pages.
Rosenberg, Arthur M., "Call Center Computer Telephony: Technology Overview," Gartner, Inc., Jan. 1998 (24 pages).
Sekine, Shoji et al., "Front Office Oriented Solution for Customer Satisfaction and Profit Expansion," Hitachi Hyoron Co, Ltd., Japan, vol. 80, No. 9, Sep. 1998, 11 pages.
Sevcik, Peter et al., "The Call Center Revolution," Northeast Consulting Technical Paper, Jan. 1, 1997, 12 pages.
Supplemental European Search Report for Application No. 98908545.1, dated Sep. 5, 2002, 4 pages.
T-Server for Alcatel A4400/OXE, Deployment Guide, Framework 7.6, Genesys An Alcatel-Lucent Company, 6 pages.
Tadamura, Katsumi et al., "Synchronizing Computer Graphics Animation and Audio," IEEE, 1998, 11 pages.
Taisei, Mori et al., "Call Center: Promotion of Information Use with a Direct Link to Core Business with Eye on the Internet Customer," Ric Telecom Corporation, Japan, vol. 10, No. 8, Aug. 1, 1998, 9 pages.
Tang, Jingrong et al., "Advanced Service Architecture for H.323 Internet Protocol Telephony," Computer Communications, vol. 23, 2000, 14 pages.
Thio, Fu Wang et al., "Distributed Multimedia Database: A Design and Application Study," The Fourth International Conference on High Performance Computing in the Asia-Pacific Region, IEEE, Beijing, China, vol. 2, May 2000, 6 pages.
Toji, Ryutaro et al., "OCN Multimedia Customer Contact System," NTT Technical Journal, The Telecommunication Association, Japan, vol. 10, No. 1, Jan. 1, 1998, 6 pages.
Wagner, Susanne., "Intralingual Speech-to-Text Conversion in Real-Time: Challenges and Opportunities," Challenges of Multidimensional Translation Conference Proceedings, 2005, 10 pages.
Wang, Yong et al., "Real-time scheduling for multi-agent call center automation", Information service agents lab, school of computing science Simon Fraser University, Burnaby,BC Canada, 1999, 13 pages.
Wolter, Roger., "XML Web Services Basics," Microsoft Corporation, Dec. 2001, 4 pages.
Derfler, Frank J. et al., How Networks Work, Que Corporation, Millennium Ed., 39 pages.

(56) References Cited

OTHER PUBLICATIONS

Solis, Ignacio et al., FLIP: a Flexible Protocol for Efficient Communication Between Heterogeneous Devices, IEEE, 2001, 10 pages.
White, Ron, How Computers Work, Que Corporation, 7th Edition, Oct. 15, 2003, 53 pages.

* cited by examiner

IMPLEMENTATION OF CALL-CENTER OUTBOUND DIALING CAPABILITY AT A TELEPHONY NETWORK LEVEL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED DOCUMENTS

[The present invention is related as a] *This application is a reissue of U.S. Pat. No. 5,991,395, filed Jun. 10, 1998 as application Ser. No. 09/095,732, which is a* Continuation-in-Part [(CIP) to copending application 08/964,309, filed Nov. 4, 1997, and also as a CIP to copending] *of* application *Ser. No.* 08/968,825, filed Nov. 14, 1997.

FIELD OF THE INVENTION

The present Invention is in the field of telecommunications and pertains more particularly to methods of implementing out bound dialing capability for a call center.

BACKGROUND OF THE INVENTION

Telephone call processing and switching systems are, at the time of the present patent application, relatively sophisticated, computerized systems, and development and introduction of new systems continues. Much information on the nature of such hardware and software is available in a number of publications accessible to the present inventors and to those with skill in the art in general. For this reason, much minute detail of known systems is not reproduced here, as to do so may obscure the facts of the invention.

At the time of filing the present patent application there continues to be remarkable growth in telephone-based information systems. Recently emerging examples are telemarketing operations and technical support operations, among many others, which have grown apace with development and marketing of, for example, sophisticated computer equipment. More traditional are systems for serving customers of large insurance companies and the like. In some cases organizations develop and maintain their own telephony operations with purchased or leased equipment, and in many other cases, companies are outsourcing such operations to firms that specialize in such services.

A large technical support operation serves as a good example in this specification of the kind of applications of telephone equipment and functions to which the present invention pertains and applies, and a technical support organization will be used from time to time in the current specification for example purposes. Such a technical support system, as well as other such systems, typically has a country-wide or even world-wide matrix of call centers for serving customer's needs. Such call center operations are more and more a common practice to provide redundancy and decentralization. However, the components of the present specification can apply to a single call center as well.

In a call center, a relatively large number of agents handle telephone communication with callers. Each agent is typically assigned to a telephone connected to a central switch, which is in turn connected by one or more trunk lines to a publicly-switched telephone network (PSTN), well-known in the art. The central switch may be one of several types, as known in the art.

An organization having one or more call centers for serving customers typically provides one or more telephone numbers to the public or to their customer base, or both, that may be used to reach the service. The number or numbers may be published on product packaging, in advertisements, in user manuals, in computerized help files, and the like. There are basically two scenarios. If the organization providing the service has a single call center, the number will be to the call center, and all further routing to an agent will be at the call center. If there are several call centers, the organization may provide several numbers, one for each call center, and the customer may be expected to use the number for the closest center, or for the center advertised to provide specifically the service he or she might need. In some cases the number provided will connect the caller with a first Service Control Point (SCP) which is adapted to pre-process incoming calls and forward the calls to other call centers.

Routing of calls, then, may be on several levels. Pre-routing may be done at SCPs and further routing may be, and almost always is, accomplished at individual call centers. As described above, a call center typically involves a central switch, which may be, for example, an Automatic Call Distributor (ACD), Private Branch Exchange (PBX), or a public-switched telephone network (PSTN) switch. The central switch is connected to the PSTN network, well-known in the art. Agents, trained (hopefully) to handle customer service, man telephones connected to the central switch. This arrangement is known in the art as Customer Premises Equipment (CPE).

The processes of incorporating computer enhancement to telephone switches is known in the art as Computer Telephony Integration (CTI), and the hardware used is referred to as CTI equipment. Such equipment includes processors, routers, servers and the like. It is this processor that provides the CTI enhancement for the call center.

More recently, call centers have been enabled to handle data network telephony (DNT). DNT equipped centers operate similarly to conventional CIT centers in function although the operations such as routing calls, switching lines, queuing calls, and so on, are performed digitally with digital equipment rather than with an analog requirement. In DNT, calls are received at each agent's computer terminal or DNT communication device. For the purpose of this specification, a CTI system will most often be referred to when describing elements of the present invention although they will apply to DNT as well.

In a CTI system telephone stations connected to the central switch may be equipped also with computer terminals, so agents manning such stations may have access to stored data as well as being linked to incoming callers by a telephone connection. Such stations may be interconnected in a network by any one of several known network protocols, with one or more servers also connected to the network one or more of which may also be connected to a processor providing CTI enhancement, also connected to the central switch of the call center.

Typically, call centers are manned by agents connected by telephone and trained to handle certain problems experienced by customers such as questions regarding complicated installations of software and so on. Another instance might be a large sales network wherein the agent is trained to take customer orders and the like. Generally, agents who are employed to operate in such a call center work on site and must log-in and be counted present so that calls can be routed to that particular agent.

In typical call center operations agents are primarily engaged in handling incoming calls from persons seeking services provided by the call center. This is not, however, the only task agents handle. In many instances there is a need for agents to make outgoing calls. An agent, for example, in interaction with a calling party, may need to research some item of information, then place a call back to the original caller. In other instances the primary function of the call center may be agent-initiated calls (sales, marketing for example). In any case, there are often reasons for agents taking part in calls originated at the call center, in addition to their other duties.

In the operation of call centers wherein calls are placed from the call center, it is known in the art to make such calls by an automatic outbound dialing system, wherein calls placed by the dialing system are answered by clients and then transferred quickly to available agents.

In most call centers, as previously described, an automatic dialer within the call center handles outbound dialing functions for the agents. In those call-centers wherein outbound calls are more prevalent, sufficient outbound channels (phone lines) must be provided to the call center so that the outbound dialer has enough channels available to keep every agent busy handling connected calls.

Because outbound dialing is automatic and a significant number of outbound calls will result in failure to connect to a real person, the hit ratio is always less than 1. If one automatically dialed outbound call is answered by a real person for every two calls made, for example, the hit ratio is 0.5.

The outbound dialer must have access to a sufficient number of channels so that connected calls may be transmitted to agents in a manner so as to keep them fairly engaged in taking calls. Therefore, at least two lines dedicated to placing outbound calls by the automatic dialer would be needed if the hit ratio is 0.5.

The outbound channels used by the automatic dialer at a customer's premise have to be assigned, leased lines. The cost, then, for the sponsor of the call center, in terms of payment for total lines, can be very significant.

In order to avoid the extra expense related to extra lines required for outbound dialing, many companies prefer to limit outbound dialing capability as much as possible. However, many businesses cannot do this as outbound calls may be key to their success. Very little has been done in the art at the time of the present application, however, to efficiently manage agent activity in handling outbound calls.

What is clearly needed is a method and apparatus wherein outbound calls can be made in automated fashion from an automatic dialing system at network level, transparent to the agent, and calls connected can be distributed efficiently among available agents. An outbound dialer such as this would require only one dedicated channel per agent at a call center, thus significantly reducing cost related to the leasing of extra lines.

SUMMARY OF THE INVENTION

In a preferred embodiment of the present invention an outbound dialer system is provided, comprising an automatic call dialer in a network having a network provider, the call center having capability of placing calls to pre-stored destination numbers; circuitry for recognizing a call answered by a person; and a calling list of destination numbers. The dialer places calls to the pre-stored destination numbers, and upon a call being answered by a person, connects the completed call to a routing point in a remote call center. The network may be a publicly-switched telephone network (PSTN), or other wide area network (WAN).

In some cases the outbound dialer is sponsored by a single organization, and all connected calls are connected to the same routing point at the call center. In other cases the system further comprises a computer-telephony integration (CTI) processor, wherein the outbound dialer is sponsored by a single organization having a plurality of call centers, and completed calls are connected to routing points at individual ones of the plurality of call centers based on pre-stored routing criteria. A variety of routing criteria may be used, such as load-balancing and the like.

In some cases the system may be operated by the network provider. In this case the system further comprises a plurality of calling lists provided by a plurality of client organizations having call centers, and the system places outbound calls based on different calling lists, connecting completed calls to call centers operated by the client organizations providing the calling lists.

In another aspect of the invention a call center system is provided, comprising a call center having a call-switching apparatus connected to a telephone network by at least one multi-channel telephony trunk line, and a plurality of agent stations having telephones connected by station-side ports to the call-switching apparatus; and an outbound dialer in the network having a network provider, the outbound dialer having capability of placing calls to pre-stored destination numbers, circuitry for recognizing a call answered by a person, and a calling list of destination numbers. The dialer places calls to the pre-stored destination numbers, and upon a call being answered by a person, connects the completed call to a routing point in the call center. The network in this case a swell may be a publicly-switched telephone network (PSTN). The dialer may be sponsored by a single organization having one or a plurality of call centers, or may be hosted by the network service provider serving a variety of clients as a subscription service.

In another aspect a method for practicing the invention is provided, comprising steps of (a) placing outbound calls by an automatic dialer in a network servicing the call center, according to destination numbers provided by the call center; (b) determining when a call is answered by a person; and (c) connecting answered calls to a routing point at the call center.

The system according to various embodiments of the invention minimizes the number of leased lines a call center has to have to keep a set of agents busy, and by so doing, minimizes the cost of operating a call center operating at least partially on placing outgoing calls to destination numbers. Objects of the invention are more fully explained below, and enabling embodiments of the invention are taught.

BRIEF DESCRIPTION OF THE DRAWING FIGURES

DESCRIPTION OF THE PREFERRED EMBODIMENTS

Figure 1:
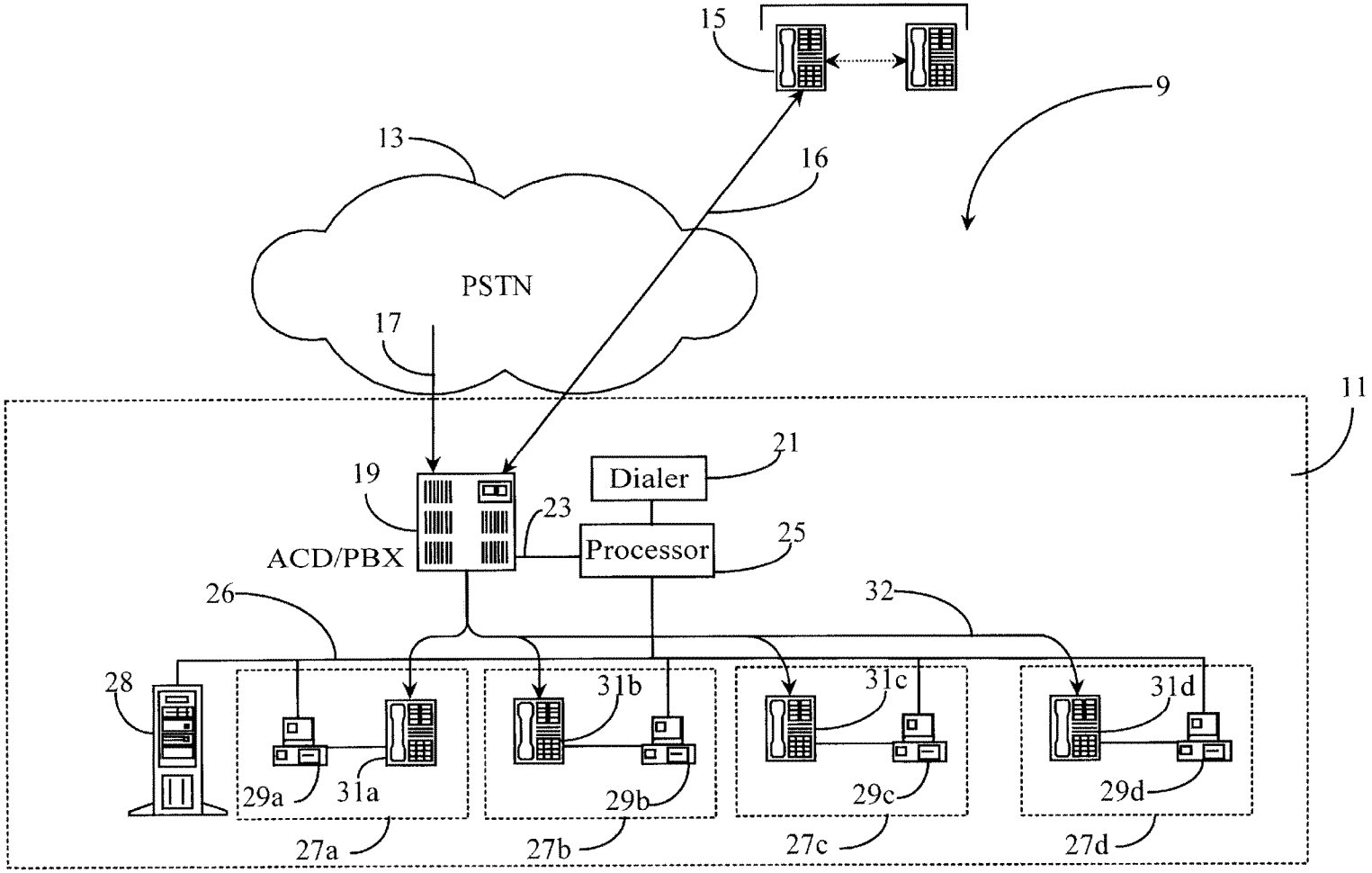
Fig. 1 (Prior Art)
FIG. 1 is an overview of a typical call center utilizing outbound dialing according to current art.

FIG. 1 is an overview of a typical call center 11 in a telephony system 9 utilizing outbound dialing according to current art. Call center 11 comprises a telephony switching apparatus 19 connected in this embodiment to a computer-telephony integration (CTI) processor 25 via CTI link 23. CTI processor 25 provides computerized functions for switch 19, and is capable of both monitoring switch activity and controlling switch activity. Switch 19 may be an automatic call distributor (ACD), a private branch exchange (PBX), or another type of telephony switch such as known in the art, having a CTI interface.

Switch 19 is connected via a telephone wiring system 32 to agent workstations 27a-27d from station-side ports. Each workstation 27a-d comprises a personal computer/video display unit (PCIVDU) and a switch-connected telephone such as PC/VDU's 29a-29d and telephones 31a-31d respectively. Workstations 27a-d share a connection through their PC/VDU's to a local area network (LAN) 26. LAN 26 also has connected thereto a data server 28 for storing and providing data to CTI processor 25 and to PC/VDUs at agent's stations.

Incoming calls to agents at call center 11 arrive from, in this example, a publicly switched telephone network (PSTN) 13 via incoming trunk 17. In other embodiments the network may be a corporate wide-area network (WAN) or other WAN.

In the example of FIG. 1 an outbound dialer 21 is linked to CTI processor 25 which is both switch- and LAN-connected. Outbound dialer 21 is automatic and operated by software according to a predetermined protocol. Outbound dialer 21 may reside separately as illustrated, or may reside in switch 19 or processor 25. It is shown as a separate unit here solely for the purpose of clarification.

Outbound dialer 21 places calls to clients 15 over an outbound trunk 16 which comprises telephony channels from switch 19 into PSTN 13. In this example the channels of trunk 16 are dedicated to outbound dialing. Trunk 16 in this example comprises at least double the number of channels as the number of agents who are actively logged onto the system for reasons as previously described with reference to the background section. That is, that many calls are not answered, others are picked up by automatic systems and the like, and only a portion are actually answered by person.

One with skill in the art will appreciate that many agents may be present and active in a very large call center requiring significant trunking architecture to effect efficient outbound dialing. The example presented here shows only 4 agents, but is deemed sufficient by the inventor for the purpose of illustrating basic call-center functionality. There are, as well, functional elements that are well known to be present in typical call-center architecture that are not illustrated here. These elements may include customer information system servers (CIS), interactive voice response units (IVR), Routers, Stat-Servers, and other such components. Such conventional elements may be assumed to be present in embodiments of the present invention.

Figure 2:
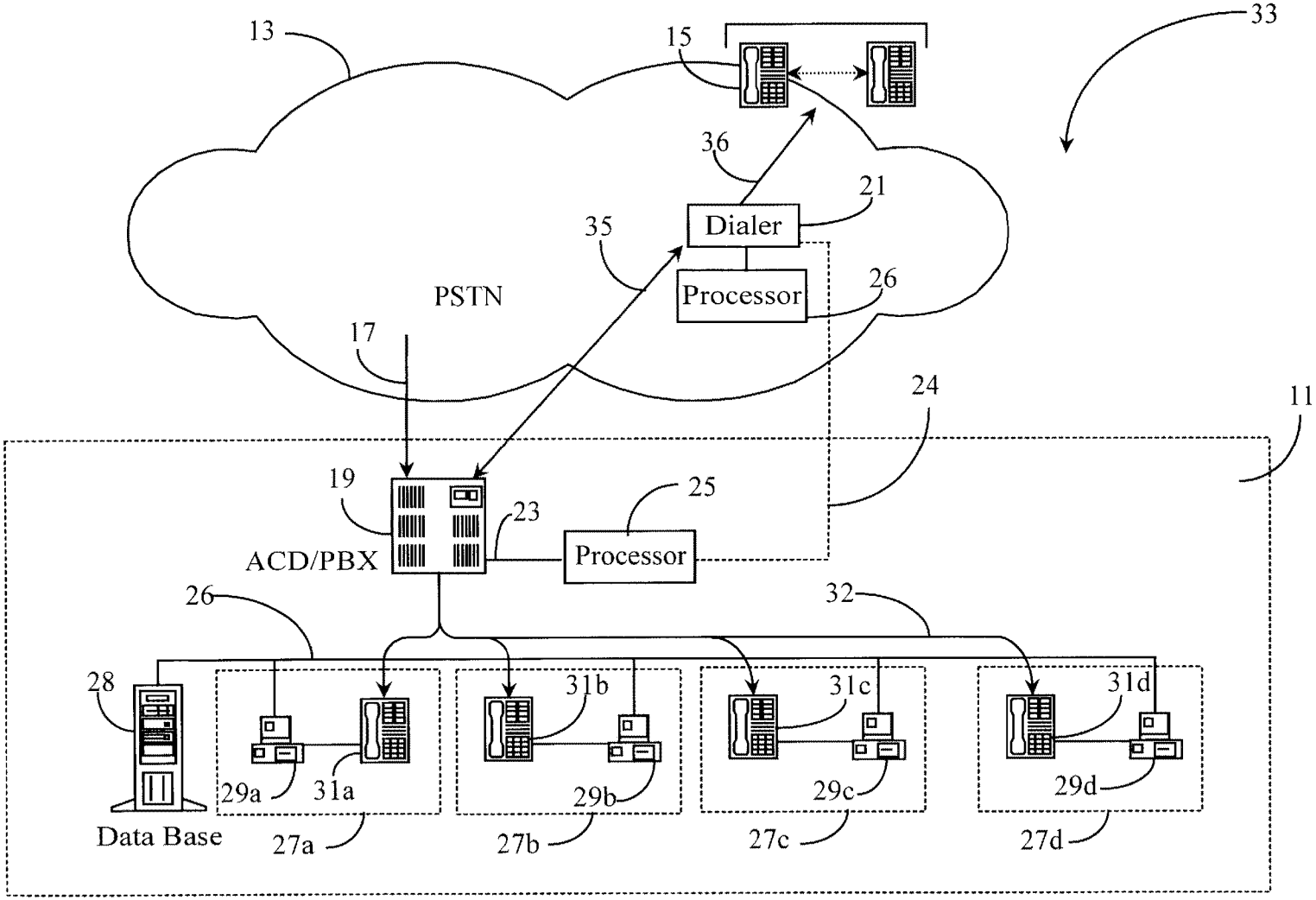
FIG. 2 is a simple overview of a call center utilizing outbound dialing according to an embodiment of the present invention.

FIG. 2 is an overview of a call center utilizing outbound dialing according to an embodiment of the present invention, wherein the outbound dialing finction resides at the network level. Telephony communications system 33 comprises many of the same elements described above with reference to FIG. 1. Therefore, elements of FIG. 2 that remain the same in function are shown with the same element numbers and will not be reintroduced. Outbound dialer 21 in this embodiment operates in the PSTN, and is supported by a CTI processor 26, which may be the same as, or similar to, CTI processor 25 at the call center. In other embodiments processor 25 may have a digital link 24 (shown as a dotted line, indicating optional) to dialer 21 in the network, and processor 26 may not be needed.

The innovative technique of providing outbound dialing at the network level allows fewer dedicated lines to be employed between switch 19 and PSTN 13. For example, trunk 16 of FIG. 1 (prior art) must maintain at least 8 outbound channels to accommodate agents at workstations 27a-d, assuming a ration of 1 out of two outbound calls being answered by a person. This high number of lines (channels) needed for the purpose of placing the outbound calls all have to be paid for. However, implementing dialer 21 at the level of PSTN 13 allows an inbound trunk 35 (FIG. 2), consisting of substantially the same number of channels as number of active agents, to be used, keeping all agents busy, because the outbound dialer now needs but one line per active agent to route connected calls.

In a preferred embodiment the outbound dialer at network level places calls to destination numbers provided by one or more call-center hosts. When a call is answered by a person, the call is connected to a routing point at the pertinent call center. The call is then routed to an agent according to any routing rules in force at the call center. These routing rules may be relatively sophisticated, incorporating agent skill level and the like, or may be on the basis of an Automatic Call Distributor (ACD) as known in the art. In some minimal embodiments calls may be dialed through directly to agents.

In alternative embodiments the routing functions may be at network level as well, including ACD or more sophisticated routing, in which case connected calls accomplished by the outbound dialer at network level may be directed to agents stations rather than to a routing point at a call center. In other embodiments ACD at the network level may accomplish routing to secondary routing points at call centers based on availability and/or loading, and further routing is then accomplished at the call center routing point.

In one embodiment of the present invention, the outbound dialing capability is hosted by the network provider, and offered to companies (clients of the network provider) hosting call centers as a subscription service. A company hosting several distributed call centers can now share costs with other similar companies via the fact that all outbound calls are shared over network lines. In this way, the cost for the service will be substantially less than each company maintaining their own outbound dialing systems within their own call centers. If there is no cost for busy or failed connections as is the case with most shared public lines, costs may be reduced even further.

In another embodiment of the present invention, routers are distributed within PSTN 13 with each router associated with a separate call center that may be hosted by one or more companies. The same outbound dialing system could accommodate all of the call centers.

In yet another embodiment of the present invention, scaled-down versions of the outbound dialing system could be distributed so that each call center connected to a distributed router would have it's own outbound dialer.

A DNT application has routing nodes in a digital data network instead of routers as known in connection-oriented, switched systems, analog to digital conversion is employed, and WAN access is provided. A combination DNT/CTI outbound dialing system is also provided as one possible architecture adapted for converting analog to digital and vice versa. In this way DNT call centers and CTI call centers may subscribe to the same service. The service in some embodiments is offered by a third party telecommunications company, in others by the local telephone company, or perhaps, may be set-up as a joint venture involving several companies hosting call centers as a way to share and reduce costs.

It will be apparent to one with skill in the art that by placing outbound dialing capability within the telephone network, significant savings can be realized by individual companies maintaining call centers. It will also be apparent to one with skill in the art that by utilizing distributed architecture within the network, that costs may even be further reduced due to sharing of the network lines.

The spirit and scope of the present invention is limited only by the claims that follow.

What is claimed is:

1. An outbound dialer system comprising:

an automatic call dialer implemented and operated at network level by a network provider, the automatic call dialer having the capability of placing calls selected from one or more stored lists of destination numbers provided by one or more clients of the network provider; and circuitry for recognizing that at least one of said placed calls is answered by a person;

wherein the dialer places said calls to the selected destination numbers, and upon *a first* one of said placed calls being answered by a *first* person, connects the answered *first* call to a *first* routing point in a remote call center hosted by a *first* client *of the one or more clients* of the network provider, *and upon a second one of the placed calls being answered by a second person, connects the answered second call to a second routing point in a second remote call center hosted by a second remote call center different from the first remote call center, wherein the second remote call center is hosted by a second client of the one or more clients of the network provider*.

2. The outbound dialer system of claim 1 wherein the network is a publicly-switched telephone network (PSTN).

3. The outbound dialer system of claim 1 wherein the outbound dialer system is hosted by a single client of the network provider, and all calls completed to persons are then connected to a routing point at a call center also hosted by the single client.

4. [The outbound dialer system of claim 3 further comprising] *An outbound dialer system comprising:*

*an automatic call dialer implemented and operated at network level by a network provider, the automatic call dialer having the capability of placing calls selected from one or more stored lists of destination numbers provided by one or more clients of the network provider;*

*circuitry for recognizing that at least one of said placed calls is answered by a person, wherein the dialer places said calls to the selected destination numbers, and upon one of said placed calls being answered by a person, connects the answered call to a routing point in a remote call center hosted by a client of the network provider; and* a computer-telephony integration (CTI) processor connected to the automatic call dialer, wherein the outbound dialer system is sponsored by a single client hosting a plurality of call centers, and wherein calls completed to persons are then connected to routing points at individual ones of the plurality of call centers based on pre-stored routing criteria.

5. The outbound dialer system of claim 4 wherein said completed calls are routed to individual call centers based on a load-balancing algorithm.

6. [The outbound dialer system of claim 1] *An outbound dialer system comprising:*

*an automatic call dialer implemented and operated at network level by a network provider, the automatic call dialer having the capability of placing calls selected from one or more stored lists of destination numbers provided by one or more clients of the network provider; and*

*circuitry for recognizing that at least one of said placed calls is answered by a person,*

*wherein the dialer places said calls to the selected destination numbers, and upon one of said placed calls being answered by a person, connects the answered call to a routing point in a remote call center hosted by a client of the network provider,* wherein the system further comprises a plurality of calling lists provided by a plurality of clients hosting call centers, and wherein the system places outbound calls from different calling lists, connecting calls completed to persons to call centers operated by the clients providing the calling lists.

7. A call center system, comprising:

[at least one] *a plurality of* call [center] *centers each* having a call-switching apparatus connected to a telephone network hosted by a network provider by at least one multi-channel telephony trunk line, and a plurality of agent stations having telephones connected by station-side ports to the call-switching apparatus, the [at least one] *plurality of* call [center] *centers* hosted by a client of the network provider; and an outbound dialer in the network implemented and operated by the network provider, the outbound dialer having the capability of placing calls to destination numbers selected from stored lists of destination numbers provided by the client, and circuitry for recognizing that at least one of said placed calls is answered by a person;

wherein the outbound dialer places said calls to the selected destination numbers, and upon *a first* one of said placed calls being answered by a *first* person, connects the answered *first* call to a *first* routing point in [the at least one] *a first call center of the plurality of* call [center] *centers, and upon a second one of said placed calls being answered by a second person, connects the answered second call to a second routing point in a second call center of the plurality of call centers, wherein the second call center is different from the first call center*.

8. The call center system of claim 7 wherein the network is a publicly-switched telephone network (PSTN).

9. The call center system of claim 7 wherein the outbound dialer system is hosted by a simple client of the network provider, and all of said calls answered by a person are connected to a routing point at the at least one call center.

10. [The call center system of claim 7 further comprising] *A call center system, comprising:*

*at least one call center having a call-switching apparatus connected to a telephone network hosted by a network provider by at least one multi-channel telephony trunk line, and a plurality of agent stations having telephones connected by station-side ports to the call-switching apparatus, the at least one call center hosted by a client of the network provider;*

*an outbound dialer in the network implemented and operated by the network provider, the outbound dialer having the capability of placing calls to destination numbers selected from stored lists of destination num-*

*bers provided by the client, and circuitry for recognizing that at least one of said placed calls is answered by a person, wherein the outbound dialer places said calls to the selected destination numbers, and upon one of said placed calls being answered by a person, connects the answered call to a routing point in the at least one call center; and* a computer-telephony integration (CTI) processor connected to the outbound dialer and a plurality of call centers hosted by the single client, wherein said calls answered by a person are then connected to routing points at individual ones of the plurality of call centers based on pre-stored routing criteria.

11. The call center system of claim 10 wherein said answered calls are routed to individual call centers based on a load-balancing algorithm.

12. [The call center system of claim 7] *A call center system, comprising:*

*at least one call center having a call-switching apparatus connected to a telephone network hosted by a network provider by at least one multi-channel telephony trunk line, and a plurality of agent stations having telephones connected by station-side ports to the call-switching apparatus, the at least one call center hosted by a client of the network provider; and*

*an outbound dialer in the network implemented and operated by the network provider, the outbound dialer having the capability of placing calls to destination numbers selected from stored lists of destination numbers provided by the client, and circuitry for recognizing that at least one of said placed calls is answered by a person,*

*wherein the outbound dialer places said calls to the selected destination numbers, and upon one of said placed calls being answered by a person, connects the answered call to a routing point in the at least one call center,* wherein the system further comprises a plurality of calling lists provided by a plurality of clients hosting call centers, and wherein the outbound dialer places outbound calls from different calling lists, connecting said calls answered by person to call centers operated by the clients providing the calling lists.

13. A method for minimizing the number of outgoing channels required for a *plurality of* call [center] *centers* having a plurality of agents and operating by outbound dialing, comprising steps of:

(a) providing, by the call center, one or more stored lists of destination numbers to be called to an automated outbound dialer implemented and operated by a network provider at network level;

(b) placing outbound calls by the automated outbound dialer in in the network servicing the call center, according to the list of destination numbers provided by the call center;

(c) determining when [individual ones] *a first one* of said outbound calls are answered by a *first* person; and (d) connecting said [calls] *first call* answered by [a] *the first* person to a *first* routing point at [the] *a first* call center *of the plurality of call centers;*

*(e) determining when a second one of said outbound calls are answered by a second person; and*

*(f) connecting said second call answered by the second person to a second routing point at a second call center of the plurality of call centers, wherein the second call center is different from the first call center.*

* * * * *